(12) United States Patent
Cho et al.

(10) Patent No.: US 11,154,860 B2
(45) Date of Patent: Oct. 26, 2021

(54) CENTRIFUGAL FORCE-BASED NANOPARTICLE SEPARATION APPARATUS AND METHOD FOR SEPARATING NANOPARTICLES USING THE SAME

(71) Applicant: UNIST (ULSAN NATIONAL INSTITUTE OF SCIENCE AND TECHNOLOGY), Ulsan (KR)

(72) Inventors: Yoon-Kyoung Cho, Ulsan (KR); Hyun-Kyung Woo, Ulsan (KR); Ja-Ryoung Han, Ulsan (KR); Tae-Hyeong Kim, Ulsan (KR); Yoon-Keun Kim, Namyangju-si (KR)

(73) Assignee: UNIST (ULSAN NATIONAL INSTITUTE OF SCIENCE & TECHNOLOGY), Ulsan (KR)

( * ) Notice: Subject to any disclaimer, the term of this patent is extended or adjusted under 35 U.S.C. 154(b) by 459 days.

(21) Appl. No.: 15/770,454

(22) PCT Filed: Oct. 21, 2016

(86) PCT No.: PCT/KR2016/011917
§ 371 (c)(1),
(2) Date: Apr. 23, 2018

(87) PCT Pub. No.: WO2017/069573
PCT Pub. Date: Apr. 27, 2017

(65) Prior Publication Data
US 2018/0297031 A1 Oct. 18, 2018

(30) Foreign Application Priority Data
Oct. 23, 2015 (KR) .................. 10-2015-0147883
Oct. 21, 2016 (KR) .................. 10-2016-0137581

(51) Int. Cl.
*B01L 3/00* (2006.01)
*G01N 1/40* (2006.01)
(Continued)

(52) U.S. Cl.
CPC ...... *B01L 3/502753* (2013.01); *B01D 63/088* (2013.01); *B01D 63/16* (2013.01);
(Continued)

(58) Field of Classification Search
CPC ................. B01L 3/502753; B01L 2400/0409
See application file for complete search history.

(56) References Cited

U.S. PATENT DOCUMENTS

2002/0151078 A1\* 10/2002 Kellogg .............. B01F 15/0233
436/45
2004/0265172 A1\* 12/2004 Pugia ................ B01L 3/502746
422/400
(Continued)

FOREIGN PATENT DOCUMENTS

KR 10-2006-0022341 A 3/2006
KR 10-2012-0088202 A 8/2012
(Continued)

OTHER PUBLICATIONS

English translation of KR10-2015-0045816 (Year: 2015).\*
(Continued)

*Primary Examiner* — Matthew D Krcha
(74) *Attorney, Agent, or Firm* — Knobbe Martens Olson & Bear LLP

(57) ABSTRACT

The present invention relates to a centrifugal force-based nanoparticle separation apparatus and method. Specifically, the present invention is based on having a low centrifugal force and a small size, and may thus separate nanovesicles unrelated to antibody specificity in a short time and without using an ultracentrifuge. Further, the present invention
(Continued)

requires no additional professional personnel and enables accurate fluid measurement by integrating and automating all processes after sample injection, and may thus reduce the loss of nanovesicles.

19 Claims, 36 Drawing Sheets

(51) Int. Cl.
| | | |
|---|---|---|
| *B04B 3/00* | (2006.01) | |
| *B04B 11/04* | (2006.01) | |
| *B04B 15/06* | (2006.01) | |
| *B01D 65/02* | (2006.01) | |
| *B01D 63/16* | (2006.01) | |
| *B01D 63/08* | (2006.01) | |

(52) U.S. Cl.
CPC .......... *B01D 65/02* (2013.01); *B01L 3/50273* (2013.01); *B04B 3/00* (2013.01); *B04B 11/04* (2013.01); *B04B 15/06* (2013.01); *G01N 1/4077* (2013.01); *B01D 2313/02* (2013.01); *B01D 2313/16* (2013.01); *B01D 2313/50* (2013.01); *B01D 2319/025* (2013.01); *B01D 2319/06* (2013.01); *B01D 2321/168* (2013.01); *B01L 2200/0652* (2013.01); *B01L 2300/0681* (2013.01); *B01L 2300/0803* (2013.01); *B01L 2400/0409* (2013.01); *G01N 2001/4088* (2013.01)

(56) References Cited

U.S. PATENT DOCUMENTS

| | | | | |
|---|---|---|---|---|
| 2010/0055766 | A1* | 3/2010 | Hwang | B01L 3/502738 435/259 |
| 2010/0086990 | A1* | 4/2010 | Stanley | G01N 21/07 435/286.1 |
| 2010/0089815 | A1* | 4/2010 | Zhang | B01L 3/502753 210/335 |
| 2011/0129931 | A1* | 6/2011 | Reboud | G01N 33/54366 436/63 |
| 2012/0258459 | A1* | 10/2012 | Huang | B01L 3/5021 435/6.11 |
| 2016/0123857 | A1* | 5/2016 | Kapur | G01N 1/4077 435/2 |

FOREIGN PATENT DOCUMENTS

| | | | |
|---|---|---|---|
| KR | 10-2013-0080307 A | | 7/2013 |
| KR | 10-2015-0045816 | * | 4/2015 |
| KR | 10-2015-00456816 A | | 4/2015 |
| KR | 10-2015-0101308 A | | 9/2015 |
| KR | 10-2016-0017374 A | | 2/2016 |
| WO | 01/87486 A2 | | 11/2001 |

OTHER PUBLICATIONS

International Search Report of PCT/KR2016/011917 which is the parent application and its English translation—4 pages, (dated Feb. 27, 2017).

\* cited by examiner

CENTRIFUGAL FORCE-BASED NANOPARTICLE SEPARATION APPARATUS AND METHOD FOR SEPARATING NANOPARTICLES USING THE SAME

CROSS-REFERENCE TO RELATED APPLICATION

This application is a 371 of PCT/KR2016/011917, filed Oct. 21, 2016, which claims the benefit of priority from Korean Patent Application No. 10-2015-0147883, filed Oct. 23, 2015 and Korean Patent Application No. 10-2016-0137581, filed Oct. 21, 2016, the contents of each of which are incorporated herein by reference in its entirety.

STATEMENT REGARDING GOVERNMENT RIGHTS

The present invention was undertaken with the support of "Fully Integrated Lab-on-a-chip for Isolation of Circulating Tumor Cells and Molecular Diagnostics" No. HI12C1845 grant funded by the Korea Health Industry Development Institute.

TECHNICAL FIELD

The present invention relates to a centrifugal force-based nanoparticle separation apparatus and a method of separating nanoparticles using the same.

BACKGROUND ART

Nanovesicles are 40-120 nm-sized small vesicles occurring in cellular activity, and distinguished from other vesicles in terms of origin and size. At the time of discovery, these nanovesicles were considered to be cell byproducts, but the importance thereof in contributing to cell activities such as tumor progression and metastasis, cell signaling, and the like has been discovered. Since nanovesicles are present in almost all body fluids of the body and contain genetic information of derived cells, such nanovesicles are drawing attention not only as a new marker of various diseases including cancer, but also as a new drug delivery system.

Recently, research on the separation of nanovesicles has been continuously increasing, and separation methods are largely classified into those using density, size, and affinity. The separation method using density is the most commonly used method whereby concentrated nanovesicles may be obtained regardless of the presence or absence of an antibody. However, this method requires a lot of time through an ultracentrifuge and several processes for sample processing. The separation method using affinity can separate high-purity nanovesicles within a short period of time, but is expensive and can separate only a small amount of nanovesicles, and it is difficult to separate nanovesicles not including a specific antibody by using this method. Therefore, there is a need for a system for separating nanovesicles irrelevant to antibody specificity within a short period of time.

An existing method of separating nanovesicles using a filter was used for filtering impurities before ultracentrifugation. To filter nanovesicles within a certain range, two types of filtration membranes including small-diameter pores and relatively large-diameter pores are required. However, in the case of pores having a small diameter (1 nm to 100 nm) in a polycarbonate filtration membrane formed using an existing technique, the size of the pores is not uniform and porosity is low, and thus it is not suitable for use in separation. Filtration membranes formed of anodic aluminum oxide have a relatively uniform pore size and high porosity, but have low durability, and thus are broken easily, and, accordingly, it is difficult to use these filtration membranes for separation. However, other size-based methods, except for the separation method using a filtration membrane, require a sample pre-processing process, and thus there are problems such as complicated processes and a professional workforce are required.

Thus, development of an apparatus and method in which all processes of urine processing and nanovesicle extraction are integrated using a disc-shaped chip based on centrifugal force is the subject of a main challenge, and research thereon has been conducted (Korean Patent Publication No. 10-2016-0017374), but this is not sufficient.

DISCLOSURE

Technical Problem

The present invention has been made to address the above-described problems, and the inventors of the present invention verified a vesicle separation effect using a simple method at lower centrifugal force than that in a conventional vesicle separation method, by using a plurality of filters having different sizes and filtering a plurality of particles from a sample using centrifugal force, thus completing the present invention on the basis thereof.

Therefore, an object of the present invention is to provide a nanoparticle separation apparatus including:

a rotatable disc-shaped housing part 100;

a sample accommodation part 200 configured to provide a space in which a fluid sample including nanoparticles is to be injected and contained;

a filtration chamber unit 300 including a filtration membrane capable of filtering nanoparticles from the fluid sample and having 1 nm to 1 μm pores;

a waste liquid accommodation part 400 configured to store the filtered sample solution, and a microchannel unit 500 configured to provide a path for the flow of the fluid sample.

Another object of the present invention is to provide a nanoparticle separation apparatus including.

a rotatable disc-shaped housing part 100;

a sample accommodation part 200 configured to provide a space in which a fluid sample is to be injected and contained;

a filtration chamber unit 300 including two or more filtration membranes capable of filtering the sample;

a waste liquid accommodation part 400 configured to store the filtered sample solution, and a microchannel unit 500 configured to provide a path for the flow of the fluid sample.

Still another object of the present invention is to provide a nanoparticle separation apparatus including:

a rotatable disc-shaped housing part 100;

a sample accommodation part 200 configured to provide a space in which a fluid sample is to be injected and contained;

a filtration chamber unit 300 configured to accommodate one or more filtration membranes capable of filtering the sample;

a waste liquid accommodation part 400 configured to store the filtered sample solution;

a microchannel unit 500 configured to provide a path for the flow of the fluid sample; and a valve 700 capable of selectively adjusting the flow of a fluid in a microchannel, to filter nanoparticles from the sample.

Yet another object of the present invention is to provide a nanoparticle separation apparatus including.

a rotatable disc-shaped housing part 100;

a sample accommodation part 200 configured to provide a space in which a fluid sample is to be injected and contained;

a filtration chamber unit 300 configured to accommodate one or more filtration membranes capable of filtering the sample;

a waste liquid accommodation part 400 configured to store the filtered sample solution;

a microchannel unit 500 configured to provide a path for the flow of the fluid sample;

a valve 700 capable of selectively adjusting the flow of a fluid in a microchannel; and a particle collection unit 800 capable of recovering the filtered nanoparticles within a specific size range, to filter and recover nanoparticles within a specific size range from the sample.

However, technical problems to be solved by the present invention are not limited to the above-described technical problems, and other unmentioned technical problems will become apparent from the following description to those of ordinary skill in the art.

Technical Solution

To achieve the above objects of the present invention, the present invention provides a nanoparticle separation apparatus including:

a rotatable disc-shaped housing part 100;

a sample accommodation part 200 configured to provide a space in which a fluid sample including nanoparticles is to be injected and contained;

a filtration chamber unit 300 including a filtration membrane capable of filtering nanoparticles from the fluid sample and having 1 nm to 1 μm pores;

a waste liquid accommodation part 400 configured to store the filtered sample solution, and a microchannel unit 500 configured to provide a path for the flow of the fluid sample.

Preferably, the fluid sample may be a biological sample selected from the group consisting of urine, blood, saliva, sputum, and the like that include an aqueous solution having various nanoparticles dispersed therein, cell bodies, rare biological particles, and the like.

Preferably, the nanoparticle separation apparatus may further include a washing chamber unit 600 configured to provide a space for containing a washing solution.

Preferably, the filtration membrane may be formed of a material selected from the group consisting of polycarbonate, polystyrene, polymethylmethacrylate, a cyclic olefin copolymer, anodic aluminum oxide, nickel, and silicon.

Preferably, the nanoparticle separation apparatus may further include one or more fasteners for attachment/detachment of the filtration chamber unit 300.

More preferably, the one or more fasteners may be formed of an elastic material selected from the group consisting of polydimethylsiloxane, silicone, latex, rubber, and the like.

Preferably, the microchannel unit 500 may be connected to a flow path that passes through the apparatus to enable the flow path of the fluid sample to be changed.

The present invention provides a nanoparticle separation apparatus including:

a rotatable disc-shaped housing part 100;

a sample accommodation part 200 configured to provide a space in which a fluid sample is to be injected and contained;

a filtration chamber unit 300 including two or more filtration membranes capable of filtering the sample;

a waste liquid accommodation part 400 configured to store the filtered sample solution; and a microchannel unit 500 configured to provide a path for the flow of the fluid sample.

Preferably, the filtration membrane may be formed of a material selected from the group consisting of polycarbonate, polystyrene, polymethylmethacrylate, a cyclic olefin copolymer, anodic aluminum oxide, nickel, and silicon.

Preferably, the filtration membranes may be selectively detachable from the housing part 100 by physical force.

Preferably, the filtration membranes of the filtration chamber unit 300 may include two or more filtration membranes stacked in the same chamber to collect nanoparticles through the filtration membranes having two or more sizes when a fluid is transferred in a single chamber.

Preferably, the filtration membranes may include a single filtration membrane in a single chamber, and the fluid sample passes through a plurality of filtration membranes in a plurality of chambers arranged at different radial coordinates to perform a plurality of filtrations of particles, to collect nanoparticles within a specific size range.

Preferably, the filtration membranes may include:

a first filtration membrane having one or more pores having a diameter of 100 nm to 1 μm; and a second filtration membrane having one or more pores having a diameter of 1 nm to 100 nm.

Preferably, the microchannel unit 500 is disposed at an upper or lower portion of the filtration chamber unit 300, and the chambers may be located apart from a central portion of the apparatus by a certain distance to minimize the loss of a solution.

The present invention provides a nanoparticle separation apparatus including:

a rotatable disc-shaped housing part 100;

a sample accommodation part 200 configured to provide a space in which a fluid sample is to be injected and contained;

a filtration chamber unit 300 configured to accommodate one or more filtration membranes capable of filtering the sample;

a waste liquid accommodation part 400 configured to store the filtered sample solution;

a microchannel unit 500 configured to provide a path for the flow of the fluid sample; and a valve 700 capable of selectively adjusting the flow of a fluid in a microchannel, to filter nanoparticles from the sample.

Preferably, the sample accommodation part 200 may perform sample purification to purify impurities in the sample.

Preferably, the sample accommodation part 200 may include, in a lower portion thereof, a space formed at an angle more inclined than a radial direction to perform impurity separation.

Preferably, the sample accommodation part 200 includes a groove to prevent the separated impurities from flowing backward.

Preferably, the sample accommodation part 200 consists of an inclined surface and a curved line to minimize the loss of and damage to the sample when the sample is transferred.

Preferably, the valve 700 is openable or closable according to an external signal.

Preferably, the valve 700 may be located outside a rotatable device for automation of all processes, and may include a system capable of controlling opening/closing of the valve 700 and a rotation speed and direction of a body.

Preferably, the waste solution accommodation part 400 may enable the separation of high-purity nanoparticles without separate impurity processing.

Preferably, the filtration chamber unit 300 may be connected to one or more waste liquid accommodation parts 400 to prevent impurities from being diffused after purification.

Preferably, the nanoparticle separation apparatus may further include one or more fasteners for attachment/detachment of the filtration chamber unit 300.

Preferably, the nanoparticle separation apparatus may minimize non-specific binding to a surface thereof by injection of the bovine serum albumin (BSA) protein or a pluronic (PEO-PPO-PEO) polymer material.

More preferably, the filtration chamber unit 300 and the waste liquid accommodation part 400 may include a vent configured to perform smooth filtration.

The present invention provides a nanoparticle separation apparatus including:

a rotatable disc-shaped housing part 100;

a sample accommodation part 200 configured to provide a space in which a fluid sample is to be injected and contained;

a filtration chamber unit 300 configured to accommodate one or more filtration membranes capable of filtering the sample;

a waste liquid accommodation part 400 configured to store the filtered sample solution;

a microchannel unit 500 configured to provide a path for the flow of the fluid sample;

a valve 700 capable of selectively adjusting the flow of a fluid in a microchannel; and a particle collector 800 capable of recovering the filtered nanoparticles within a specific size range, to filter and recover nanoparticles within a specific size range from the sample.

Preferably, the recovering of the filtered nanoparticles may be performed in such a manner that, when a solution including nanoparticles to be recovered is adjacent to an upper surface of the filtration membrane and a waste liquid is adjacent to a lower surface thereof, the waste liquid adjacent to the lower surface thereof is discharged to the waste liquid accommodation part 400 at a lower rotation speed, i.e., a maximum of 3,000 rpm or less, than a capillary pressure inside pores present in the filtration membrane, and then the solution including nanoparticles, located at the upper surface of the filtration membrane, may be selectively recovered.

Preferably, the particle collector 800 may be connected to an upper surface of the filtration chamber unit 300 via a microchannel, and a lower surface of the filtration chamber unit 300 may be connected to the waste liquid accommodation part 400.

Advantageous Effects

The present invention relates to a nanoparticle separation apparatus and method. Specifically, since the apparatus and method are based on low centrifugal force and size, nanovesicles irrelevant to antibody specificity can be separated within a short period of time without using a conventional ultracentrifuge, and by integrating and automating all processes after sample injection, an additional professional workforce is not required and accurate fluid measurement is possible, and, accordingly, the loss of nanovesicles can be reduced.

DESCRIPTION OF DRAWINGS

FIGS. 3a-3d illustrate front views of a nanoparticle separation apparatus according to the present invention, wherein FIG. 3a illustrates a perspective view of a microfluidic device, FIG. 3b illustrates a configuration of the microfluidic device, FIG. 3c illustrates a process of separating particles according to filters, and FIG. 3d illustrates scanning electron microscope (SEM) images of filters I and II.

FIGS. 4a-4e illustrate a process of separating nanovesicles using a nanoparticle separation apparatus according to an embodiment of the present invention, wherein FIG. 4a illustrates impurity precipitation, FIG. 4b illustrates nanovesicles concentrating process, FIG. 4c illustrates a washing process, FIG. 4d illustrates the removal of a solution remaining in filter II, and FIG. 4e illustrates a process of collecting nanovesicles.

FIGS. 5a-5c illustrate an actual structure of a nanoparticle separation apparatus according to an embodiment of the present invention, wherein FIG. 5a illustrates exploded views of the nanoparticle separation apparatus, FIG. 5b illustrates structures of filters of the nanoparticle separation apparatus, and FIG. 5c illustrates a side view of the nanoparticle separation apparatus and an SEM image of surfaces of the filters.

FIGS. 7a-7e illustrate confirmation results of performance of filters of a nanoparticle separation apparatus according to an embodiment of the present invention, wherein FIG. 7a illustrates a 100 nm particle filtration capability of a combination of a 200 nm AAO filter and a 100 nm AAO filter, FIG. 7b illustrates a 100 nm particle filtration capability of a combination of a 600 nm TEPC filter and a 20 nm AAO filter, and FIG. 7c illustrates capabilities of a 600 nm TEPC filter and a 20 nm AAO filter to filter a mixed solution including 800 nm and 100 nm particles.

FIGS. 9a-9d illustrate analysis results of the concentration of nanovesicles before/after disc execution through NTA by using a nanoparticle separation apparatus according to the present invention, wherein FIG. 9a illustrates results of the concentration of nanovesicles separated from a supernatant in which LNCaP cells were cultured, FIG. 9b illustrates results of the concentration of powder from urines of bladder cancer patients, FIG. 9c illustrates SEM images showing results of confirming whether vesicles separated from urines of bladder cancer patients were filtered through filter II, and FIG. 9d is a transmission electron microscope (TEM) image of vesicles recovered from filter II.

BEST MODE

Figure 1A:
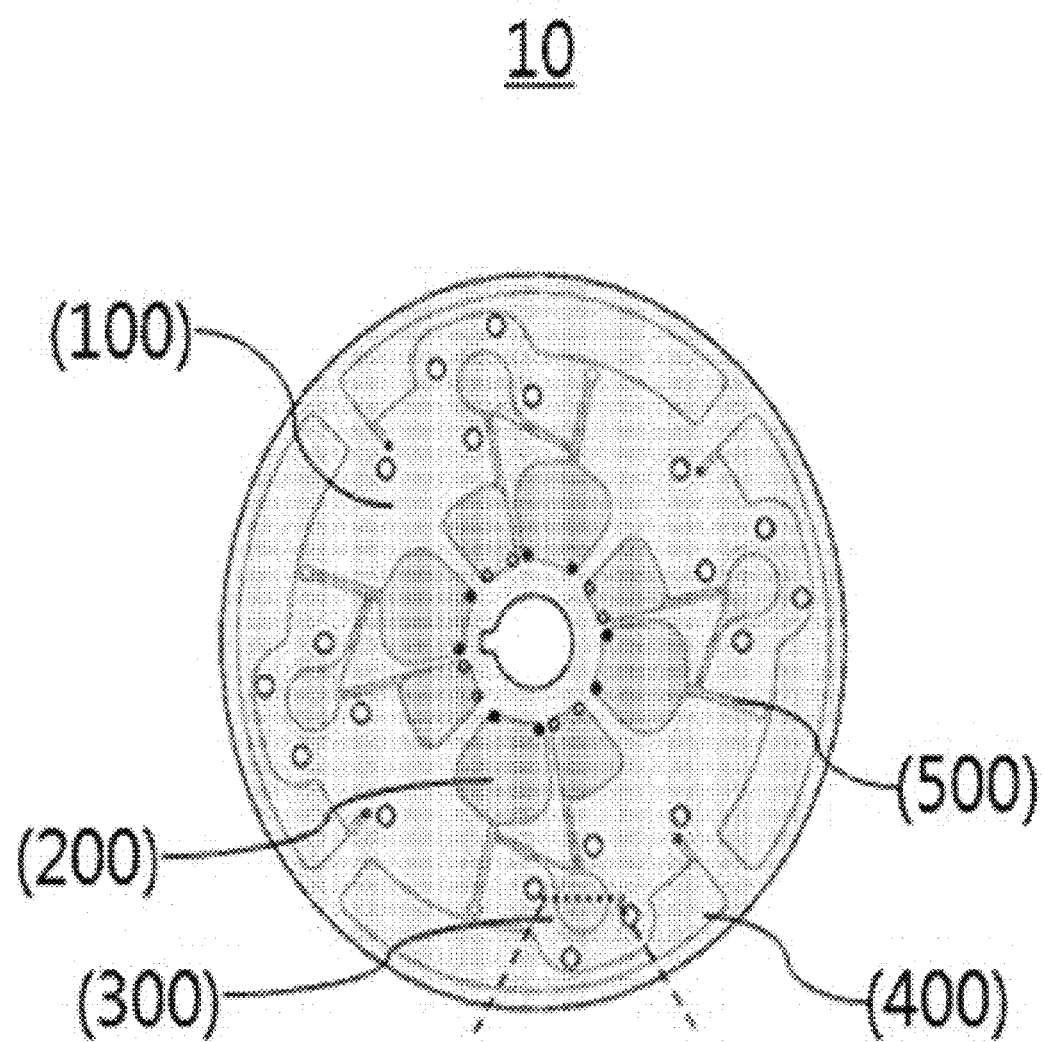
FIGS. 1a-1c illustrate perspective views of a nanoparticle separation apparatus in which nanovesicle separation processes are integrated.

Hereinafter, example embodiments of the present invention will be described in detail with reference to the accompanying drawings in such a manner that the invention may be carried out by those of ordinary skill in the art without undue difficulty. Shapes, sizes, ratios, angles, numbers, and the like illustrated in the drawings to describe examples of the present invention are provided for illustrative purposes, and thus the present invention is not limited by the illustrations. However, in description of example embodiments of the present invention, detailed descriptions of related functions or configurations in the art will be omitted when it is deemed that they may unnecessarily obscure the essence of the present invention. In addition, components having similar functions and actions are denoted by like reference numerals throughout the drawings.

In addition, in the entire specification, when a part is referred to as being "connected" with another part, it includes not only a case where it is directly connected, but also a case where it is indirectly connected with another component present therebetween. In addition, the terms "includes" as used herein does not preclude the presence of other components, but further includes other components unless otherwise specifically stated herein.

Figure 1B:
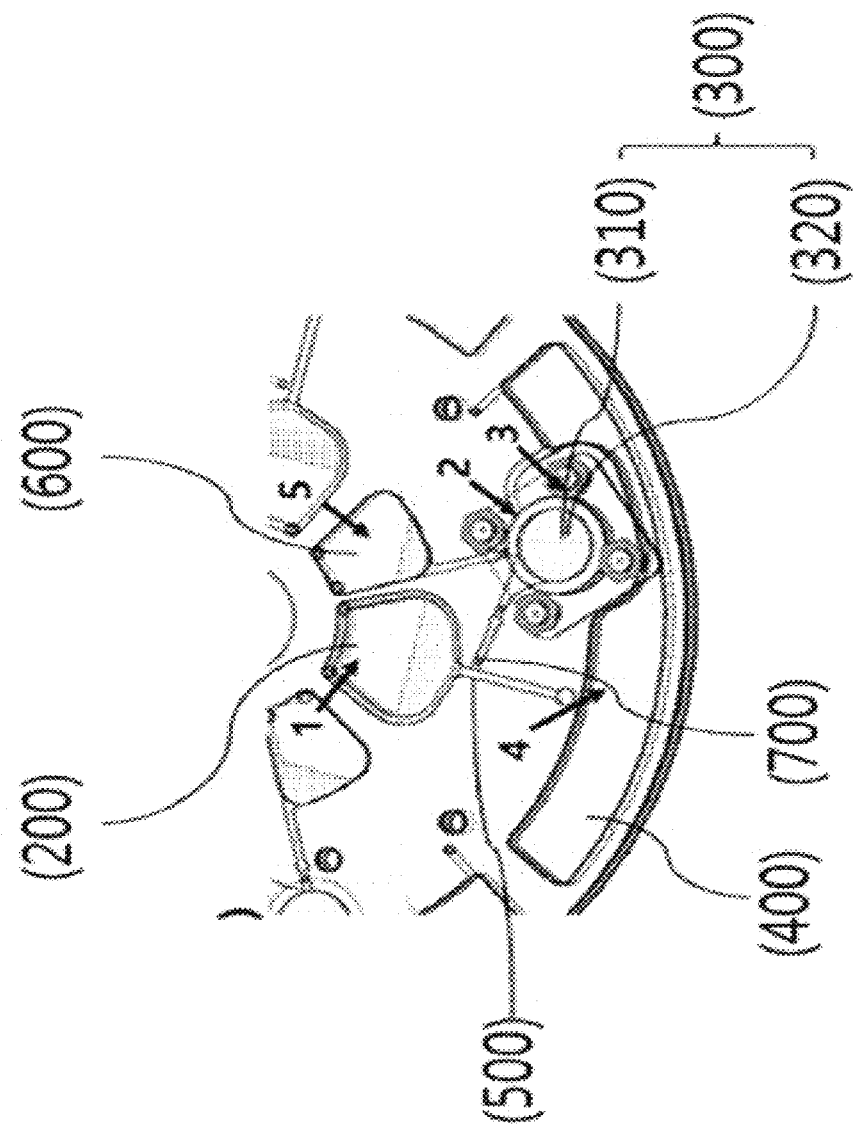
Figure 3A:
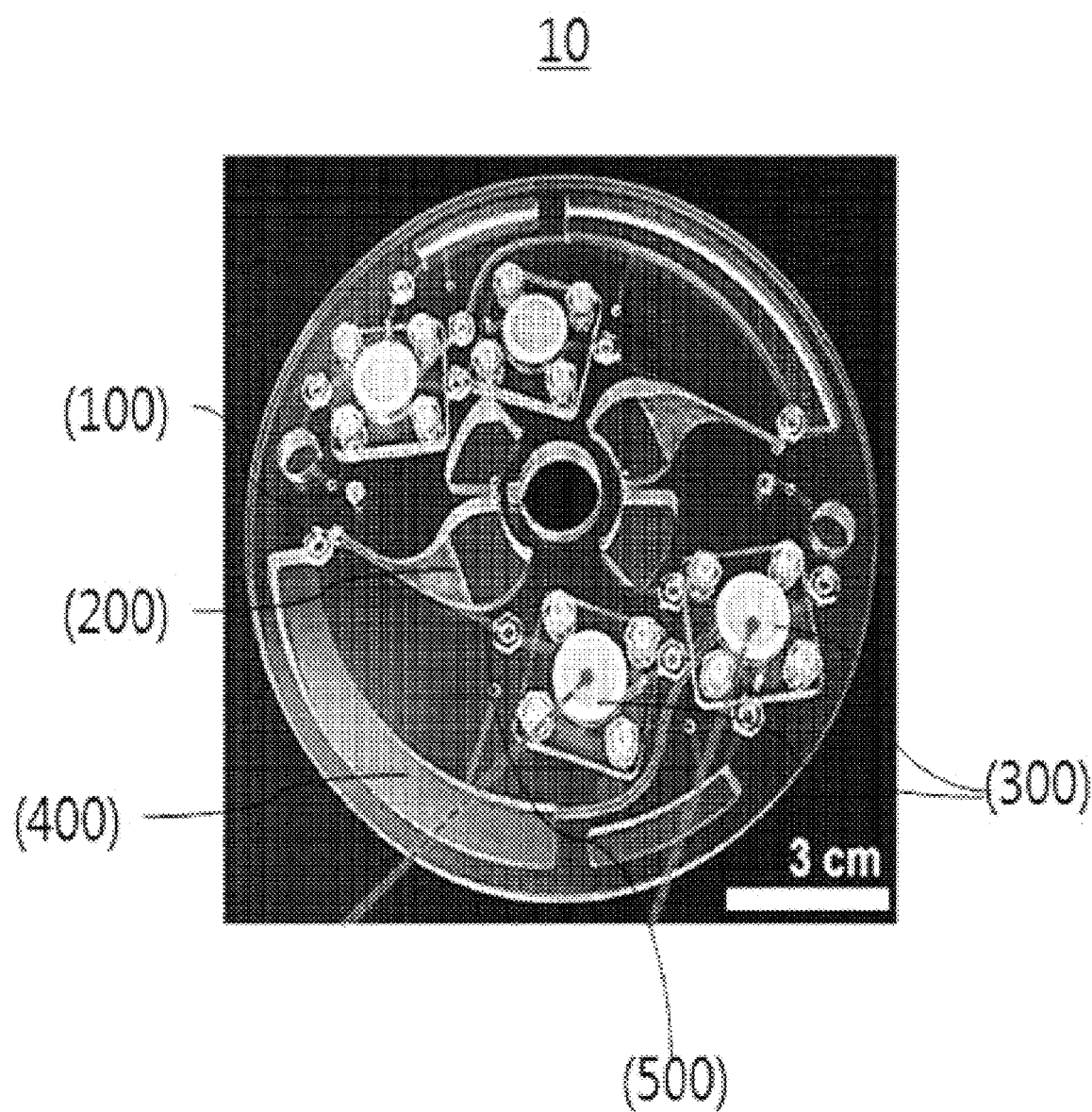
Figure 3B:
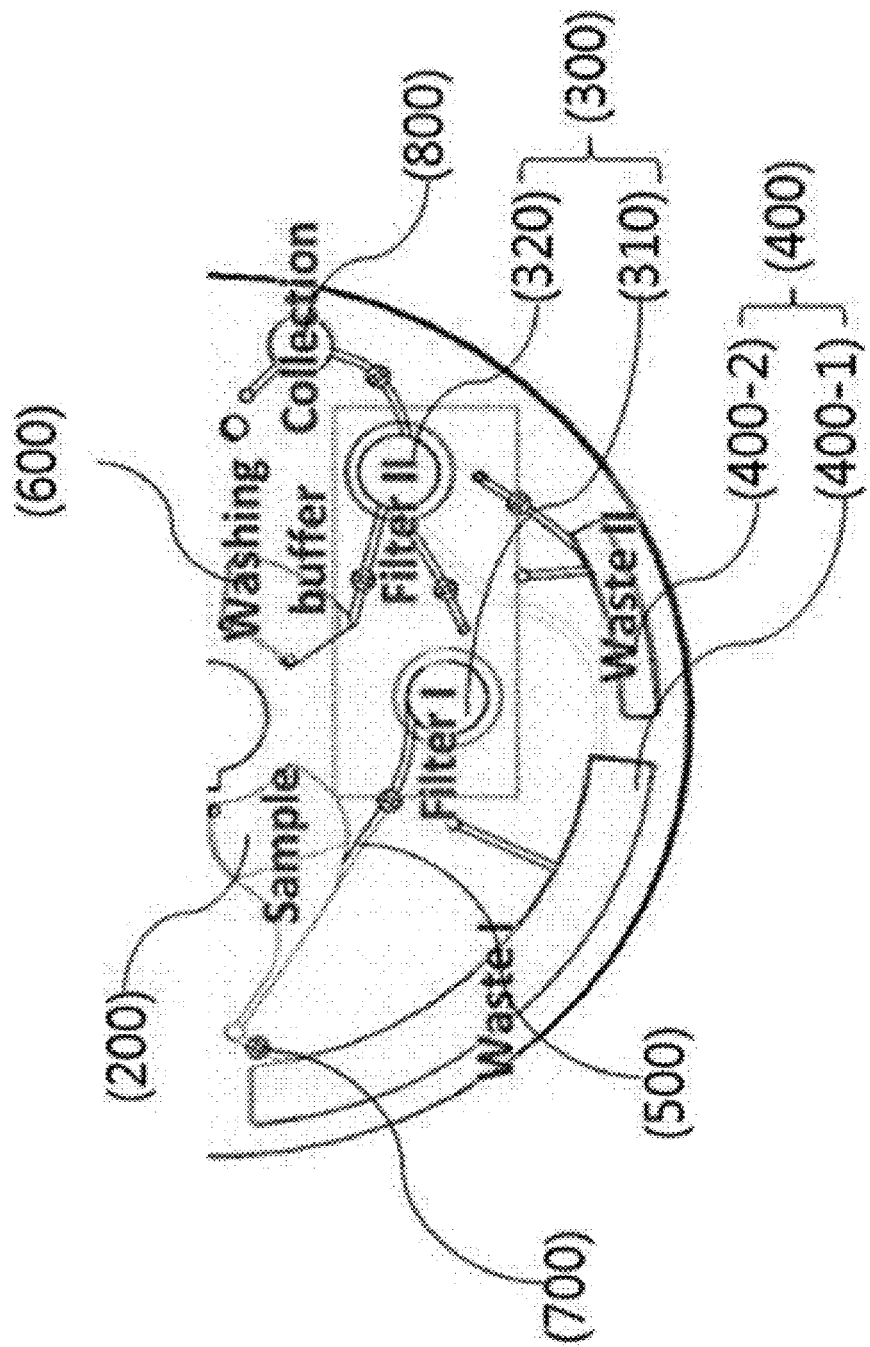

FIGS. 1a and 3a are perspective views of a nanoparticle separation apparatus 10 according to an embodiment of the present invention. FIGS. 1b and 3b are enlarged views of the nanoparticle separation apparatus 10 according to an embodiment of the present invention. As illustrated in FIGS. 1a and 3a, the nanoparticle separation apparatus 10 according to an embodiment of the present invention may include a housing part 100, a sample accommodation part 200, a filtration chamber unit 300, a waste liquid accommodation part 400, and a microchannel unit 500. As illustrated in FIG. 1b and/or 3b, the nanoparticle separation apparatus 10 may further include a washing chamber unit 600, a valve 700, and/or a particle collector 800.

The nanoparticle separation apparatus 10 according to an embodiment of the present invention may be able to separate nanovesicles within a desired range from an introduced fluid sample through centrifugal force generated by rotation of the nanoparticle separation apparatus 10. In addition, various fluid samples may be separated at the same time. By adopting such a configuration, it is possible to separate only nanovesicles irrespective of antibody specificity even at a low centrifugal force, and thus it is expected that the nanoparticle separation apparatus 10 can be used as an apparatus that integratedly and automatically performs all processes and provides a high nanovesicle recovery rate.

Hereinafter, components constituting the nanoparticle separation apparatus 10 according to an embodiment of the present invention will be described in detail.

The housing part 100 is configured to provide a space in which elements, which will be described below, are to be installed, and to be rotatable itself to provide centrifugal force for separating nanovesicles from a fluid sample. Here, the housing part 100 may be made of a polycarbonate (PC) material, but the present invention is not limited thereto.

The sample accommodation part 200 is configured to provide a space in which a fluid sample to be separated is to be contained, and is installed in the housing part 100 and has, at a lower end portion thereof, an inclined surface at an angle more inclined than a radial direction to rapidly separate impurities when a sample is introduced thereinto and centrifugal force is applied thereto at the same time. In addition, the sample accommodation part 200 includes a groove (not shown) to prevent the separated impurities from flowing backward, and consists of the inclined surface and a curved line, thus minimizing the loss of and damage to the sample when the sample is transferred. Here, the fluid sample may be a biological sample such as urine, blood, saliva, sputum, or the like that includes a nanoparticle-dispersed aqueous solution, cell bodies, and rare biological particles, and is preferably urine, but the present invention is not limited thereto.

The filtration chamber unit 300 includes one or more filtration membranes to collect desired nanoparticles, and according to need, may be detachable from the housing part 100 by physical force. At this time, for smooth attachment and detachment, the filtration chamber unit 300 may further include a fastener (not shown). Meanwhile, as illustrated in FIGS. 1b and 3b, the filtration chamber unit 300 may include a first filter part 310 and a second filter part 320.

The nanoparticle separation apparatus 10 according to the present invention is based on a principle that nanovesicles within a desired range can be acquired from the sample by using a plurality of filtration membranes having mutually different pore sizes, and, for example, may filter nanoparticles with a desired size collected between the filtration membranes by using a combination of a filter to filter impurities with a large particle size and a filtration membrane having a size that allows impurities having a smaller particle size than that of desired particles to pass therethrough.

Thus, as described above, in the present invention, the first filter part 310 and the second filter part 320 that have a plurality of pores with different sizes may be included, but a filter part for filtration or collection may be added for use according to the size of desired nanoparticles.

At this time, the filtration membranes may have a stacked or separated structure depending on a user's practice, and such a stacked or separated structure may affect the collection of nanovesicles separated in an automation process. For example, in collecting nanovesicles, the stacked structure may collect nanovesicles by physically separating and eluting filters, whereas the separated structure may more conveniently collect vesicles through integration of the entire process without a filter separation process.

More specifically, the first filter part 310 is configured to filter primary impurities in the fluid sample, and may be connected to the sample accommodation part 200 as illustrated in FIGS. 1b and 3b. In this regard, to filter impurities with a large particle size, the first filter part 310 may have a plurality of pores having a diameter of, preferably, 100 nm to 1 μm, more preferably 600 nm.

The second filter part 320 is configured to remove secondary impurities and simultaneously collect only desired nanoparticles, and, for example, the second filter part 320 may pass particles having a smaller size than a desired range and collect only nanovesicles within a desired range.

Meanwhile, as illustrated in FIGS. 1b and 3b, the second filter part 320 may be connected to the first filter part 310 and the washing chamber unit 600, which will be described below, but as described above, in a case in which filtration membranes are formed as a stacked structure according to a combination position of the filtration membranes (see FIG. 1b), the first filter part 310 and the second filter part 320 perform filtering in the same chamber. In contrast, in a case in which the filtration membranes are formed as a structure separated from each other (see FIG. 3b), the first filter part 310 and the second filter part 320 are formed as independent chambers at different radial coordinates such that the fluid sample passes through a plurality of filtration membranes, thereby performing a plurality of filtrations of particles. In addition, according to need, the filtration chamber unit 300 may be connected to one or more washing chamber units 600.

At this time, to filter impurities with a small particle size except for nanovesicles within a desired range, the second filter part 320 may have a plurality of pores having a diameter of preferably, 1 nm to 100 nm, more preferably 20 nm. Here, the impurities with a small particle size, which are secondary impurities, may be a non-blood vessel protein.

In addition, to filter nanovesicles within a certain range, as described above, a nanovesicle separation method using a filtration membrane, according to the present invention, requires two types or more of filtration membranes including pores having a small diameter and pores having a large diameter. However, a conventional filtration membrane is formed of a polycarbonate material, and when a filtration membrane having pores with a small diameter (1 nm to 100 nm) is fabricated using the polycarbonate material, the size of the pores is not uniform and porosity is low, and thus it is not suitable for use in uniform separation of vesicles. In addition, when a filtration membrane is formed of anodic aluminum oxide, the size of pores is relatively uniform and high porosity may be obtained, but the filtration membrane is easily broken due to weak durability thereof. Therefore, the nanoparticle separation apparatus 10 according to an embodiment of the present invention separates nanovesicles by using a low centrifugal force, and thus may prevent a decrease in durability due to the use of the anodic aluminum oxide. Accordingly, the use of a filtration membrane formed of a material having a uniform pore size and high porosity may be enabled.

Thus, a suitable material of filtration membranes constituting the first filter part 310 and the second filter part 320 may be polycarbonate, polystyrene, polymethylmethacrylate, a cyclic olefin copolymer, anodic aluminum oxide, nickel, silicon, or the like, and is most preferably anodic aluminum oxide.

The waste liquid accommodation part 400 is configured to provide a space to accommodate a sample solution filtered through the first filter part 310 and the second filter part 320, and as illustrated in FIGS. 1b and 3b, may be connected to the first filter part 310 and the second filter part 320, to accommodate the filtered sample. In this regard, the waste liquid accommodation part 400 may be configured as one or in a plurality according to a position relationship between the first filter part 310 and the second filter part 320. For example, when a position structure of the filtration chamber unit 300 is of a stacked type, the first filter part 310 and the second filter part 320 may be directly connected to each other in a single chamber, and thus the filtered sample may be accommodated using only a single waste liquid accommodation part 400. When the filtration chamber unit 300 is configured as independent chambers, to prevent impurities from being diffused after purification due to backflow of the separated filtrate due to centrifugal force and accurately measure a fluid, the waste liquid accommodation part 400 may be configured as one or more waste liquid accommodation parts 400, but the present invention is not limited thereto.

The microchannel unit 500 is configured to provide a space for the flow of a sample between the above-described components, and as illustrated in FIGS. 1b and 3b, is located between a plurality of chambers and located at an upper or lower portion of the filtration chamber unit 300, and the chambers are arranged a certain distance apart from a central portion of the apparatus 10, thereby minimizing the loss of a solution. In addition, the microchannel unit 500 may be connected to a flow path that passes through the apparatus to enable the flow path of the fluid sample to be changed. Meanwhile, the microchannel unit 500 may include first to third microchannel parts and/or a seventh microchannel part, and as described above, the arrangement of the microchannel unit 500 may vary according to the arrangement between filters according to a user's practice.

For example, when the position structure of the filtration chamber unit 300 is of a stacked type, the first microchannel part 510 connects the sample accommodation part 200 and the waste liquid accommodation part 400, the second microchannel part 520 connects the washing chamber unit 600, which will be described below, to the first filter part 310 and the second filter part 320, and the third microchannel part 530 connects the first microchannel part 510 to the first filter part 310 and the second filter part 320.

In contrast, when the position structure of the filtration chamber unit 300 is formed as independent chambers, the first microchannel part 510 connects the sample accommodation part 200 and a waste liquid accommodation part 400-1, the second microchannel part 520 connects the sample accommodation part 200 and the first filter part 310, the third microchannel part 530 connects the first filter part 310 and the second filter part 320, a fourth microchannel part 540 connects the washing chamber unit 600 and the second filter part 320, a fifth microchannel part 550 connects the third microchannel part 530 and the waste liquid accommodation part 400-1, a sixth microchannel part 560 connects the second filter part 320 and a waste liquid accommodation part 400-2, and the seventh microchannel part 570 connects the second filter part 320 and the particle collector 800, which will be described below.

The washing chamber unit 600 is configured to provide a space in which a washing solution for washing the filtration membranes of the filtration chamber unit 300 is to be contained, and as illustrated in FIGS. 1b and 3b, may be connected to the filtration chamber unit 300. At this time, a preferred washing solution may be phosphate buffer saline (PBS).

The valve 700 is configured to open/close a flow path between components to prevent flow in an undesired direction due to centrifugal force, in the flow of a sample between the above-described components, and may be located on the microchannel unit 500 connected to each component. Here, the valve 700 may be automatically opened or closed according to an external signal. Meanwhile, as described above, the arrangement of the valve 700 may vary according to the disposition of filtration membranes according to a user's practice.

For example, when the position structure of the filtration membranes is of a stacked type, a first valve 710 is disposed on the first microchannel part 510, a second valve 720 is disposed on the second microchannel part 520, and a third valve 730 is disposed on the third microchannel part 530.

In contrast, when the position structure of the filtration membranes is formed as independent chambers, the first valve 710 is disposed on the first microchannel part 510, the second valve 720 is disposed on the second microchannel part 520, the third valve 730 is disposed on the third microchannel part 530, a fourth valve 740 is disposed on the fourth microchannel part 540, a fifth valve 750 is disposed on the sixth microchannel part 560, and a sixth valve 760 is disposed on the seventh microchannel part 570.

Meanwhile, as described above, the nanoparticle separation apparatus 10 according to an embodiment of the present invention may affect the collection of nanovesicles according to the arrangement of filtration membranes of the filtration chamber unit 300. For example, when filtration membranes have a stacked structure, to separate and acquire nanovesicles, processes of injecting a sample, separating the second filter part 320 from the nanoparticle separation apparatus 10, and then acquiring vehicles on the filter may be performed. Thus, to more efficiently separate vesicles, when filtration membranes of the filtration chamber unit 300 are formed as independent chambers, the nanoparticle separation apparatus 10 may further include the particle collector 800 configured to collect vesicles from the second filter part 320 including an independent chamber.

More specifically, the particle collector 800 is configured to provide a space for collecting the acquired nanovesicles, and as illustrated in FIG. 3*b*, may be connected to the second filter part 320, and due to this, nanovesicles remaining after being filtered through the second filter part 320 may be accommodated in the particle collector 800 by centrifugal force. More specifically, a waste liquid is discharged to the waste liquid accommodation part 400 at a rotation speed. i.e., a maximum of 3.000 rpm or less that is lower than capillary pressure inside pores present in a filtration membrane, and then only nanoparticles located at an upper surface of a filtration membrane of the second filter part 320 may be selectively recovered.

Meanwhile, as described above, configurations of the nanoparticle separation apparatus 10 according to an embodiment of the present invention may vary according to positions of a plurality of filtration membranes according to a user's practice. A difference between the above-described configurations may lead to a difference in the integration of nanovesicle separation processes.

Figure 1C:
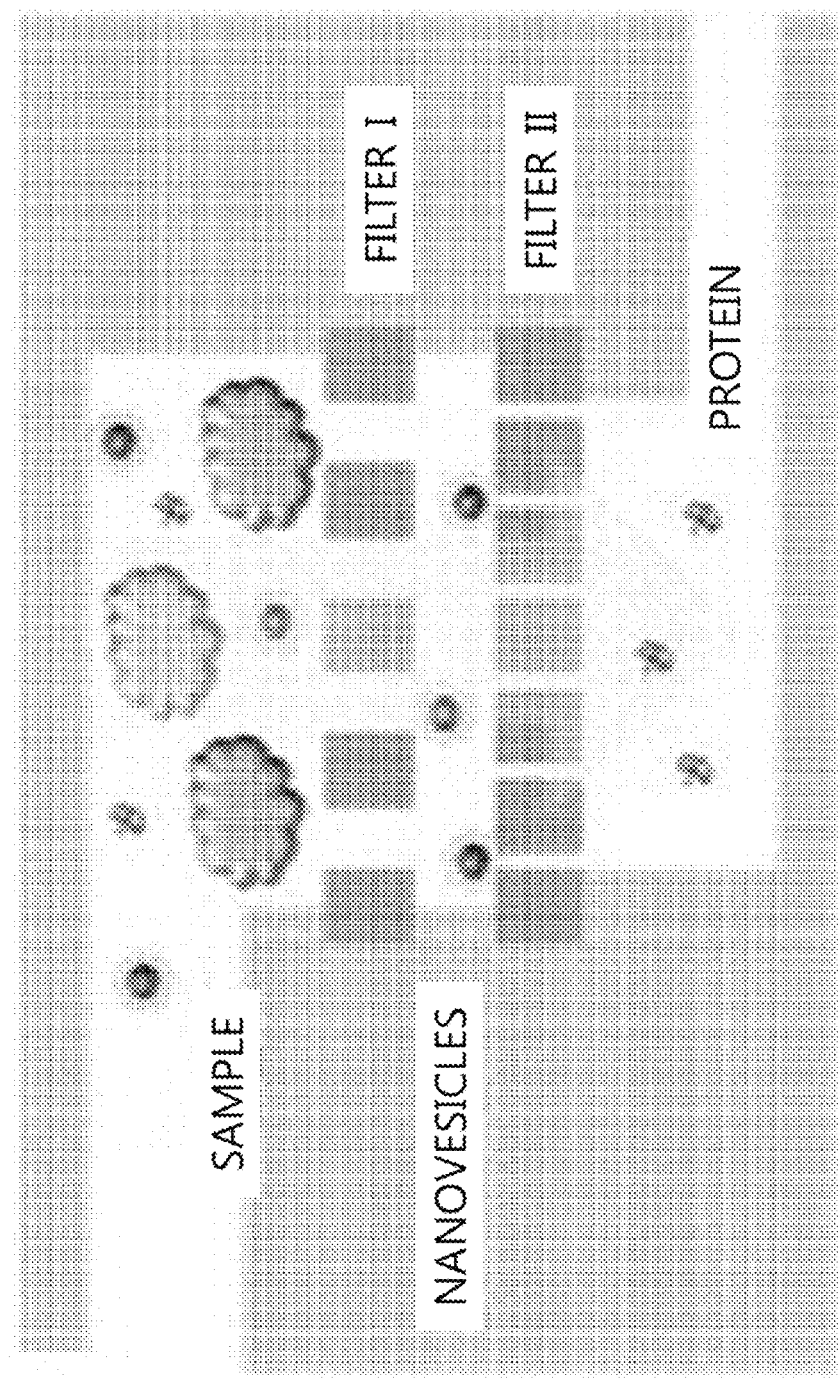

For example, as illustrated in FIG. 1*b*, when the position structure of filtration membranes of the filtration chamber unit 300 is of a stacked type, each component is as follows:

1) the sample accommodation part 200 configured to accommodate an urine sample and separate impurities 2) the washing chamber unit 600 configured to accommodate a washing solution for increasing the purity of nanovesicles 3) the first filter part 310 configured to separate other vesicles and having a pore diameter of 600 nm 4) the second filter pan 320 configured to separate nanovesicles and having a pore diameter of 30 nm 5) the waste liquid accommodation part 400 configured to accommodate small impurities except for nanovesicles 6) the microchannel unit 500 connecting components to allow the sample to flow therethrough 7) the valve 700 configured to selectively adjust the flow of a fluid between the components Through such components, as illustrated in FIG. 1*c*, nanoparticles within a desired range may be filtered from the sample by using two filtration membranes having different sizes.

In addition, as illustrated in FIG. 1*a*, the nanoparticle separation apparatus 10 may consist of four identical units to enable 4 types of samples to be separated at the same time, and after adhesive layer assembly, the second filter part 320 having a pore diameter of 30 nm may be fixed thereto, thus enabling smooth attachment/detachment. At this time, to attach or detach the second filter part 320, the second filter part 320 may be fixed via a fastener having elasticity, and as a suitable gasket material, polydimethylsiloxane, silicone, latex, rubber, or the like may be used, but the present invention is not limited thereto.

Next, when the arrangement of filtration membranes of the filtration chamber unit 300 is of a stacked type, as illustrated in FIG. 2, all processes of a vesicle separation method are automatically performed after injecting a sample (red water) and a washing solution (yellow water), and are as follows.

Figure 2A:
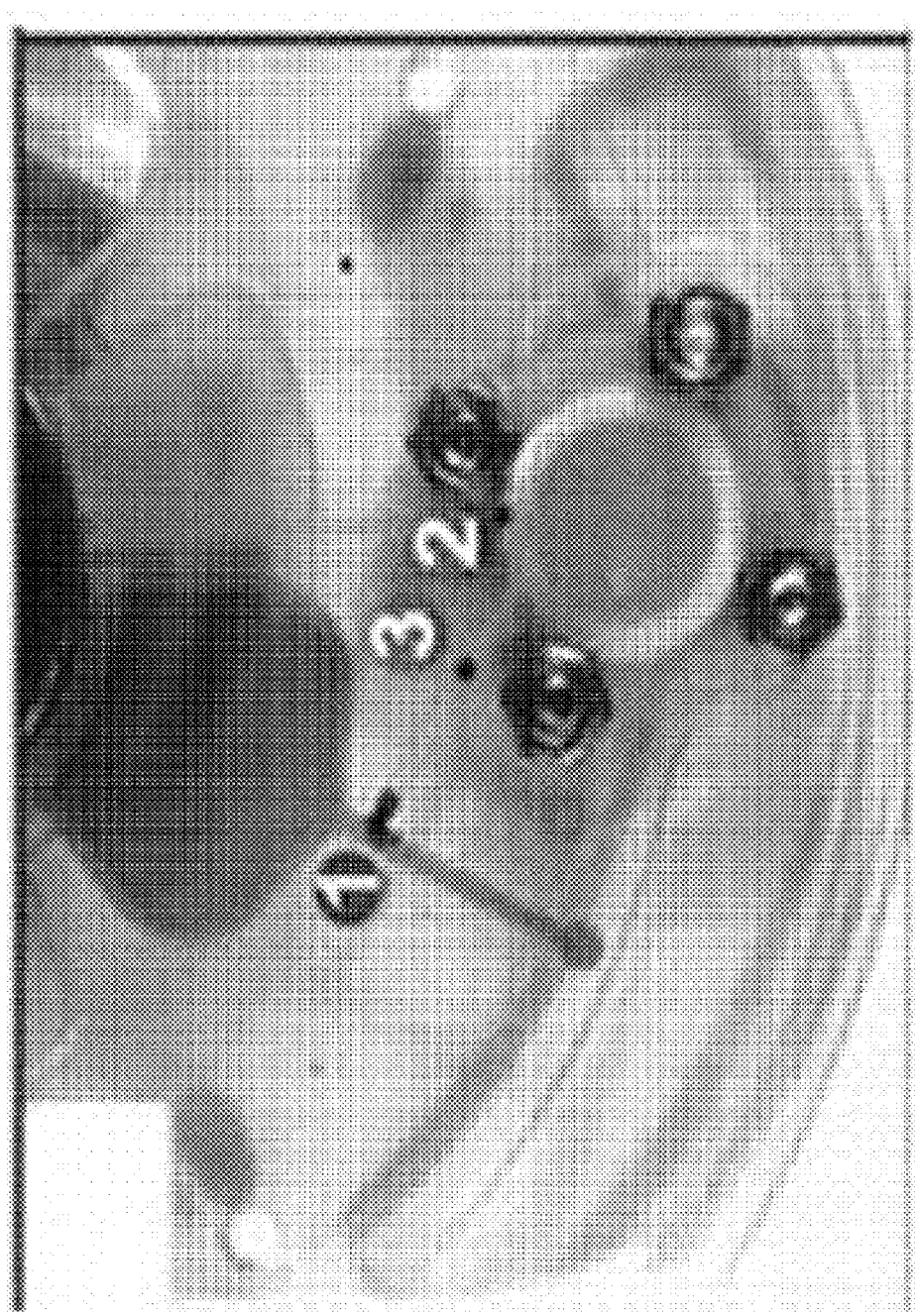
FIGS. 2a-2f illustrate observation results of nanoparticle separation processes over time by using a nanoparticle separation apparatus of the present invention.

1) A disc consists of three valves and four chambers (the sample accommodation part 200, the filtration chamber unit 300, the waste liquid accommodation part 400, and the washing chamber unit 600), and a red circle represents a closed valve and a blue circle represents an opened valve (see FIG. 2*a*).

Figure 2B:
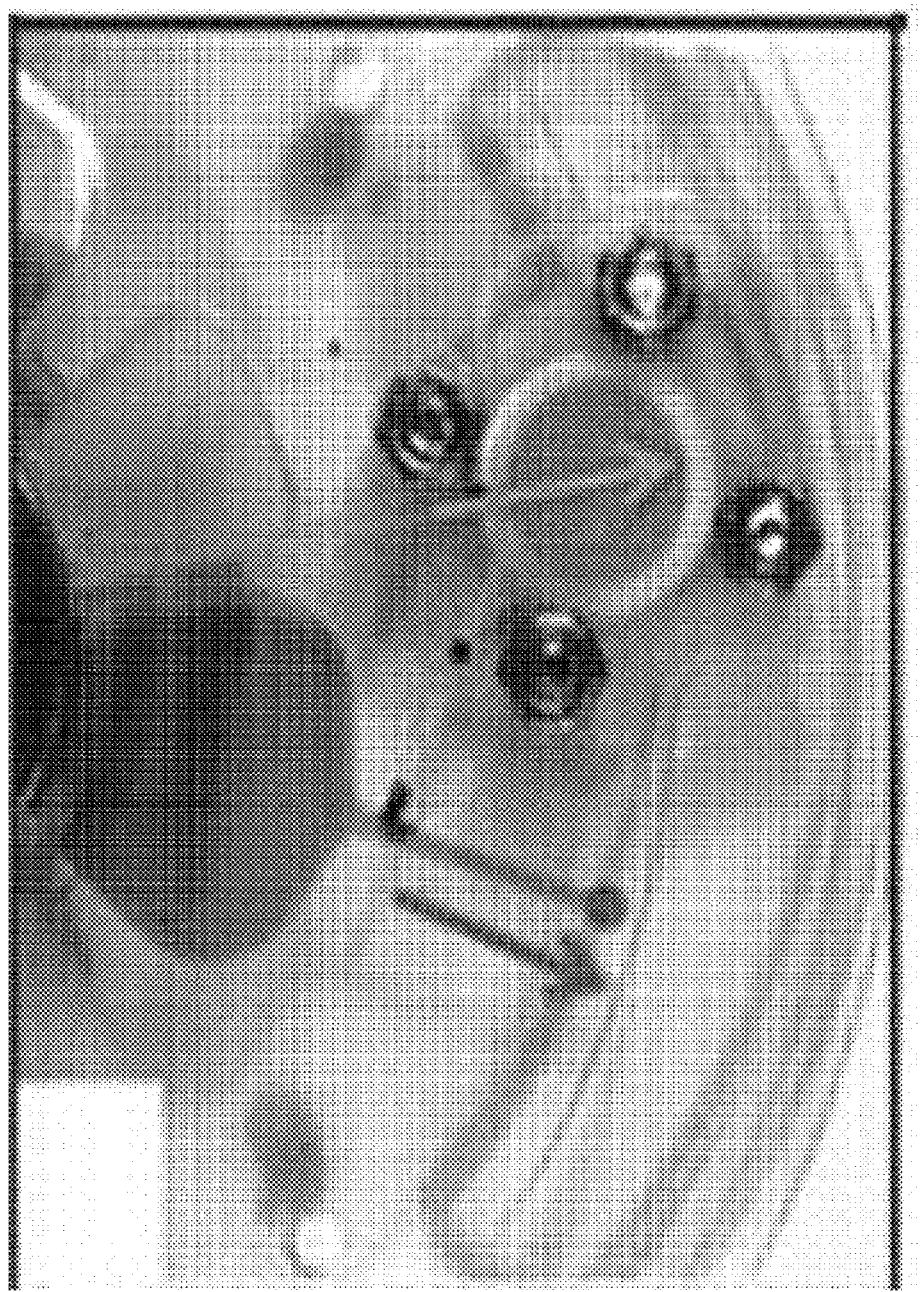
Figure 2C:
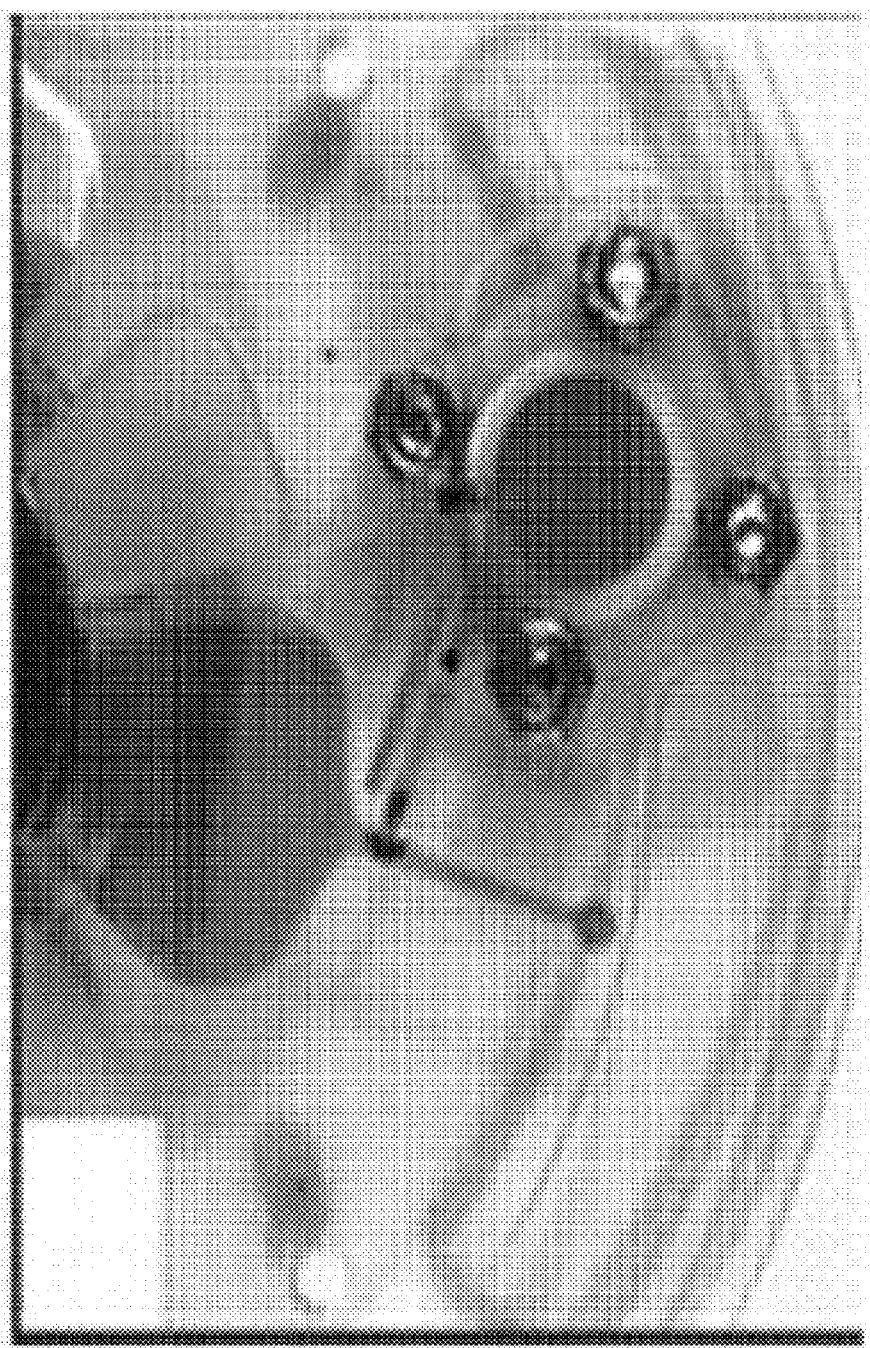

2) As represented by a red arrow, impurities are extracted from a sample in an impurity processing chamber by centrifugal force, and a blue arrow represents a filter washing process (see FIG. 2*b*).

3) Other vesicles are filtered and then transferred to a chamber including a 600 nm filter through an opened first valve, and nanovesicles are filtered and other small impurities are moved to a discharge chamber by centrifugal force. At this time, the backflow of a solution may be prevented by closing a second valve (see FIG. 2*c*).

Figure 2D:
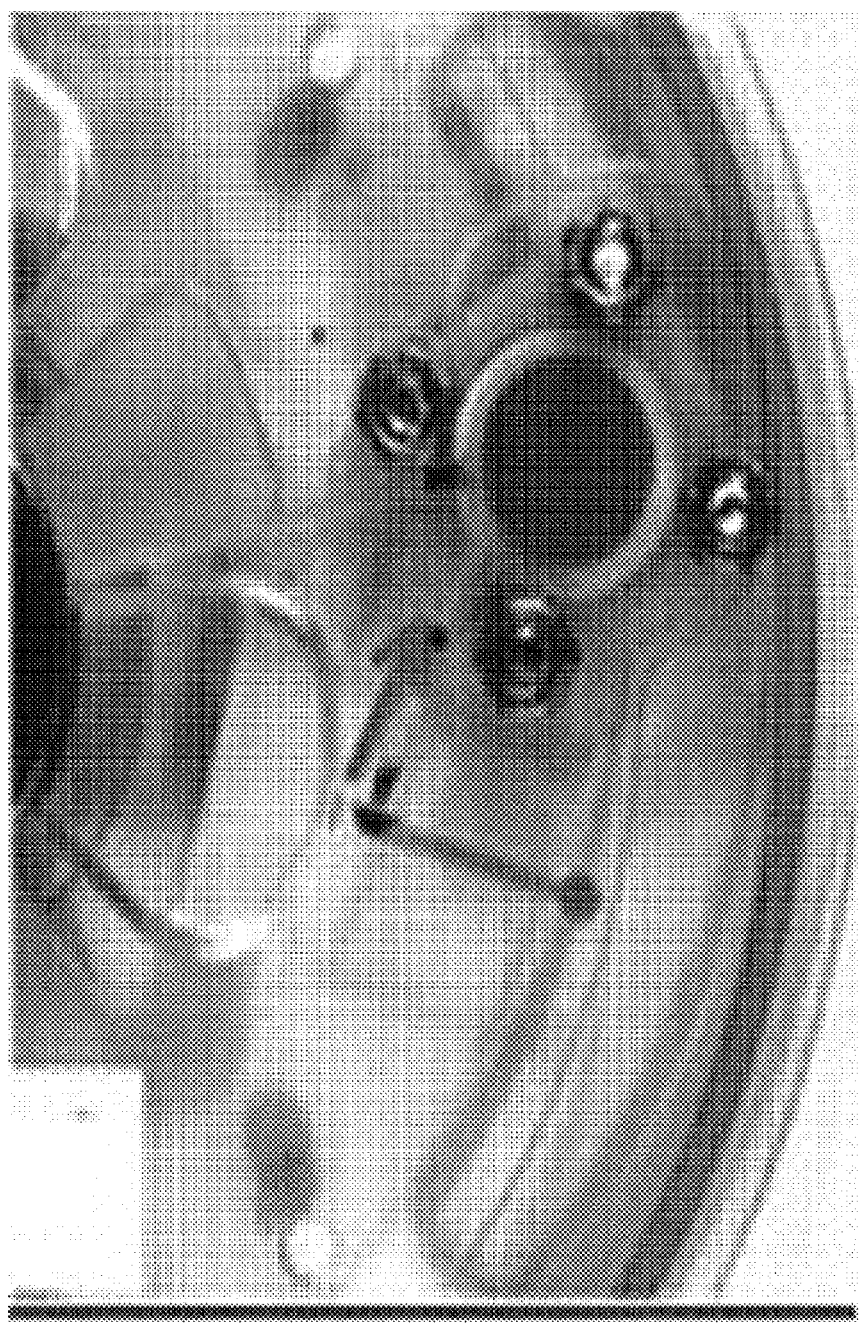
Figure 2E:
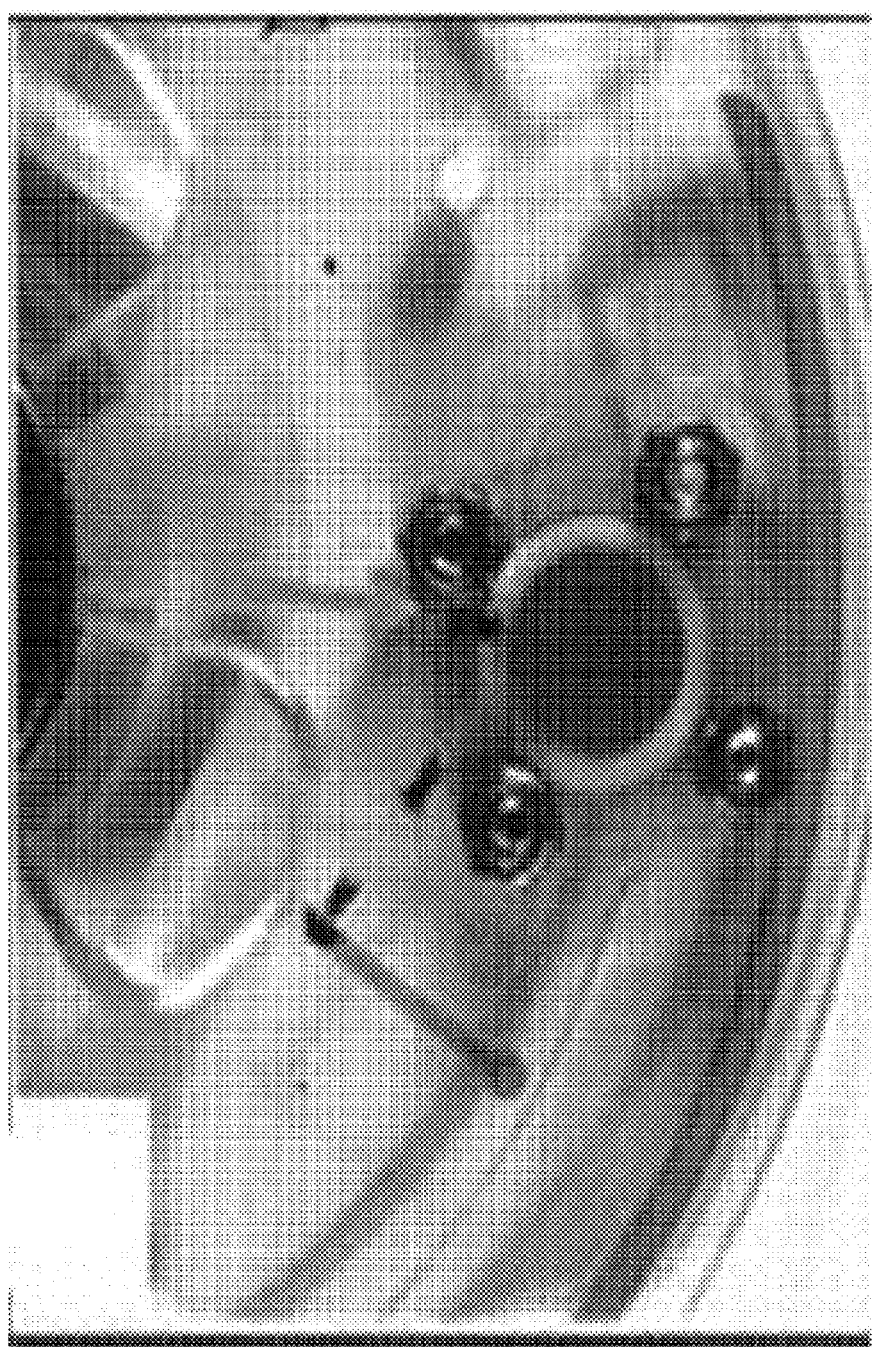

4) After transferring all samples, nanovesicles are filtered on a 30 nm filter (see FIG. 2*d*).

5) A washing solution is transferred to a chamber including a filter to remove impurities except for the nanovesicles. At this time, the backflow of the solution may be prevented by closing a third valve (see FIG. 2*e*).

Figure 2F:
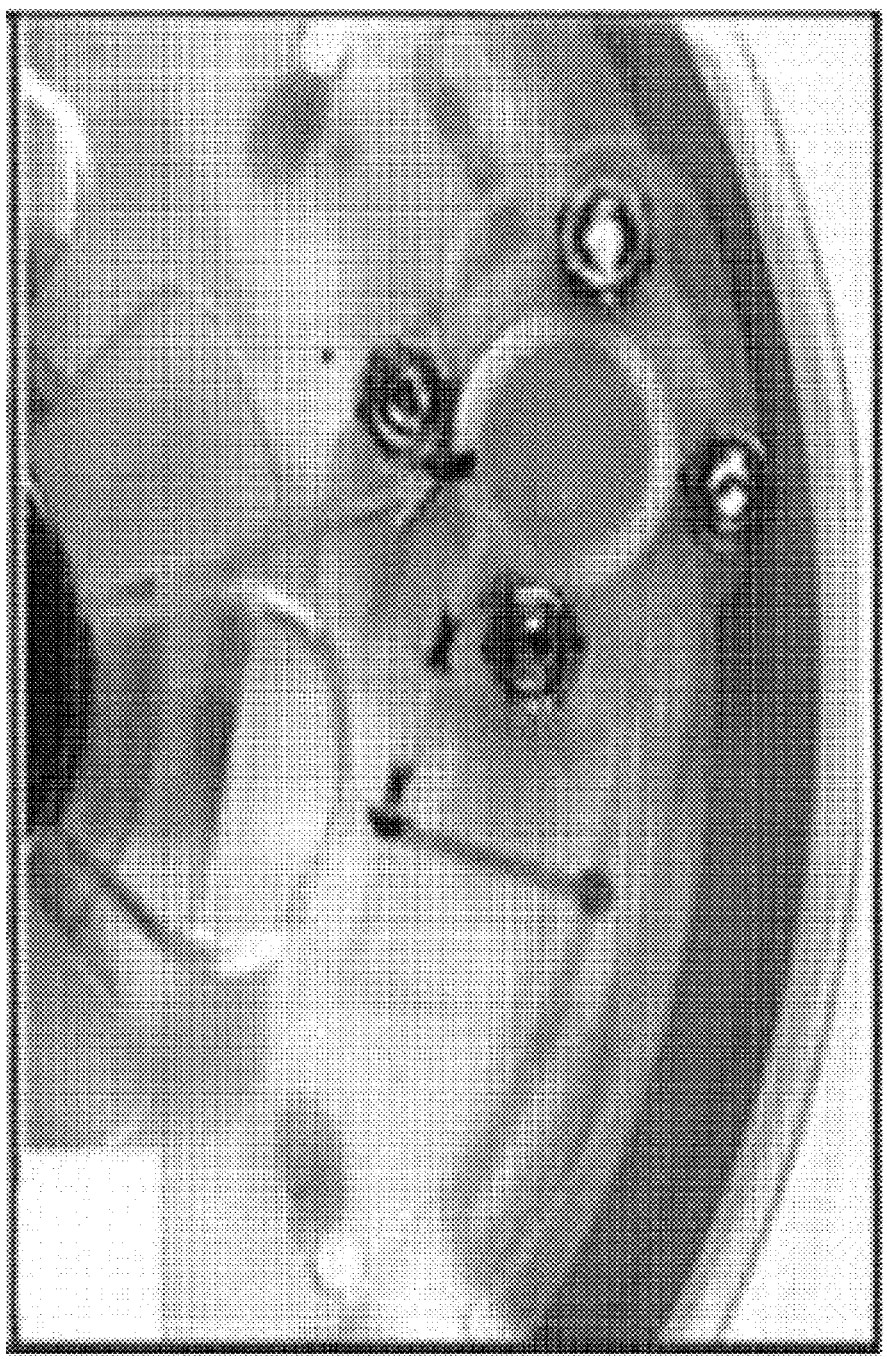

6) Nanovesicles from which impurities are removed after washing remain on the 30 nm filter, and then the filter may be separated and eluted to thereby obtain nanovesicles (see FIG. 2*f*).

As described in the above 6), when the position structure of filtration membranes of the filtration chamber unit 300 is of a stacked type, nanovesicles are separated by performing a filtration membrane separation process.

Meanwhile, when filtration membranes of the filtration chamber unit 300 are formed as independent chambers, all vesicle separation processes are integrated and each component is as follows as illustrated in FIG. 3*b*.

Figure 3C:
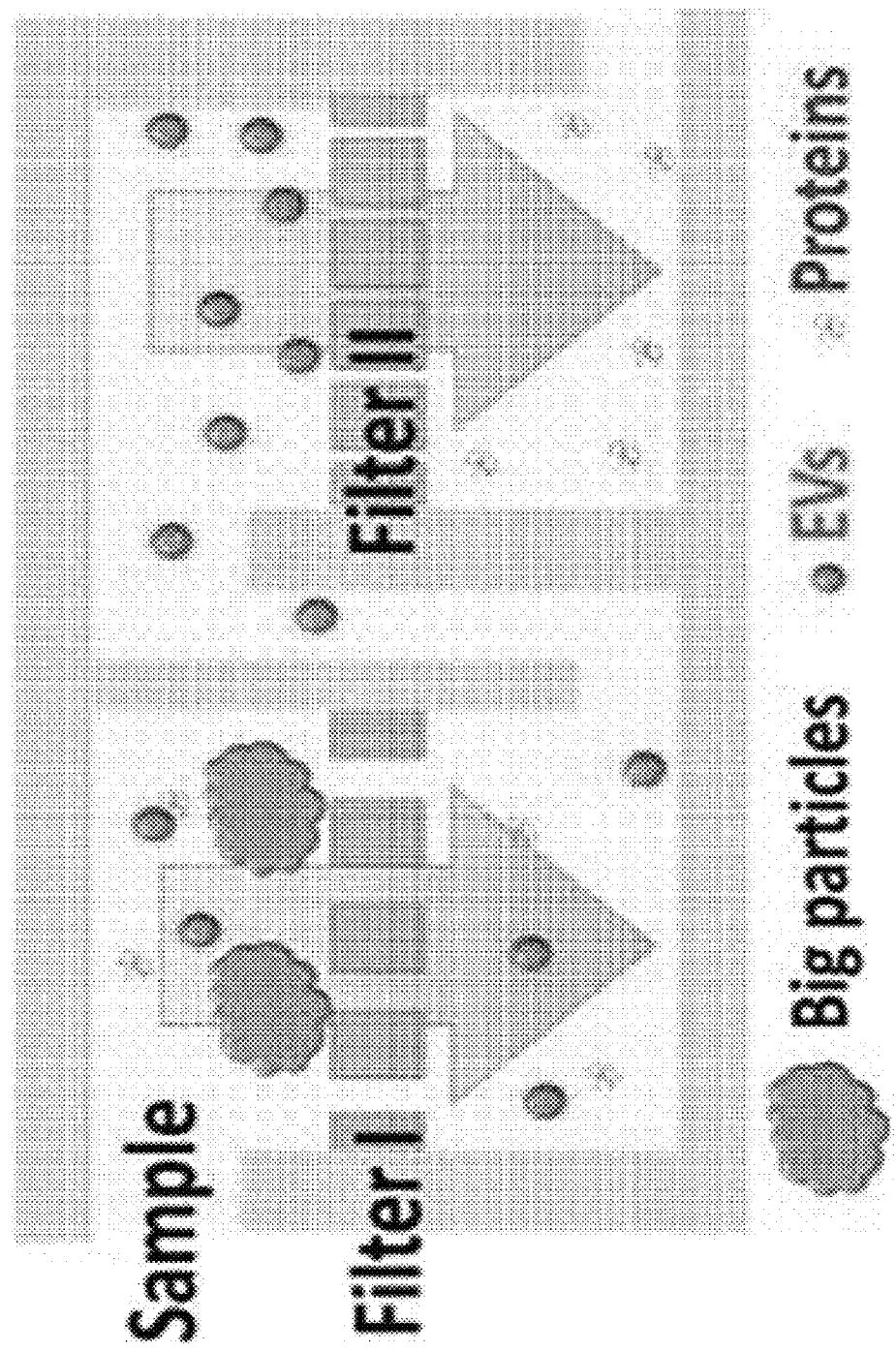

1) the sample accommodation part 200 configured to accommodate an urine sample and separate impurities 2) the washing chamber unit 600 configured to accommodate a washing solution for increasing the purity of nanovesicles 3) the first filter part 310 configured to separate other vesicles 4) the second filter part 320 configured to separate nanovesicles 5) the waste liquid accommodation part 400 configured to accommodate small impurities except for nanovesicles 6) the microchannel unit 500 connecting components to allow the sample to flow therethrough 7) the valve 700 configured to selectively adjust the flow of a fluid between the configurations 8) the particle collector 800 configured to collect nanovesicles Through such components, as illustrated in FIG. 3*c*, since the nanoparticle separation apparatus 10 further includes the particle collector 800 capable of collecting nanovesicles, vesicles may be acquired without separate filters after sample injection, unlike a case in which the position structure of the filtration chamber unit 300 is of a stacked type, and thus all processes up to a nanovesicle separation process are integrated.

Figure 3D:
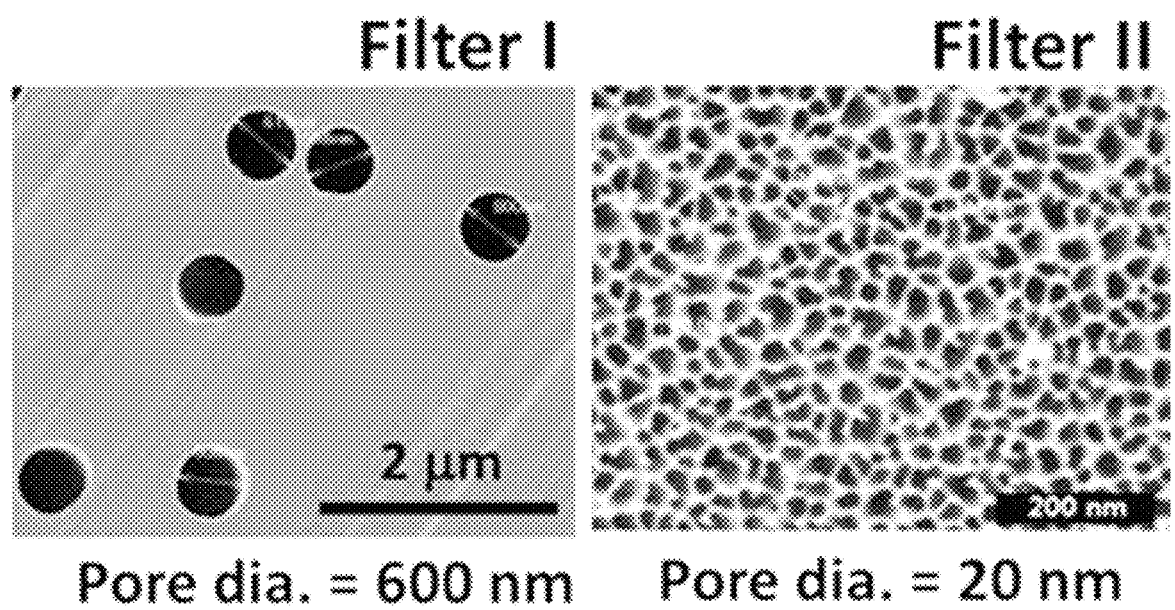
Figure 4A:
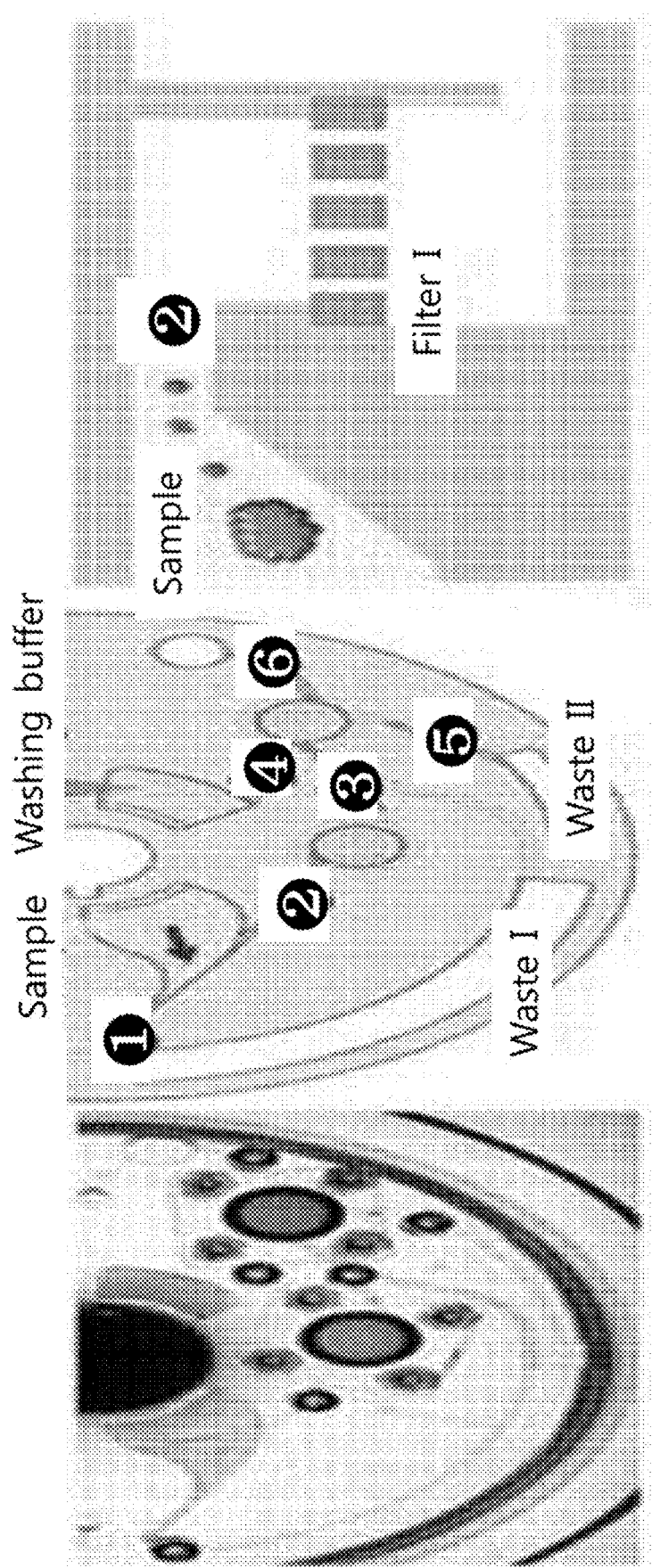
Figure 4B:
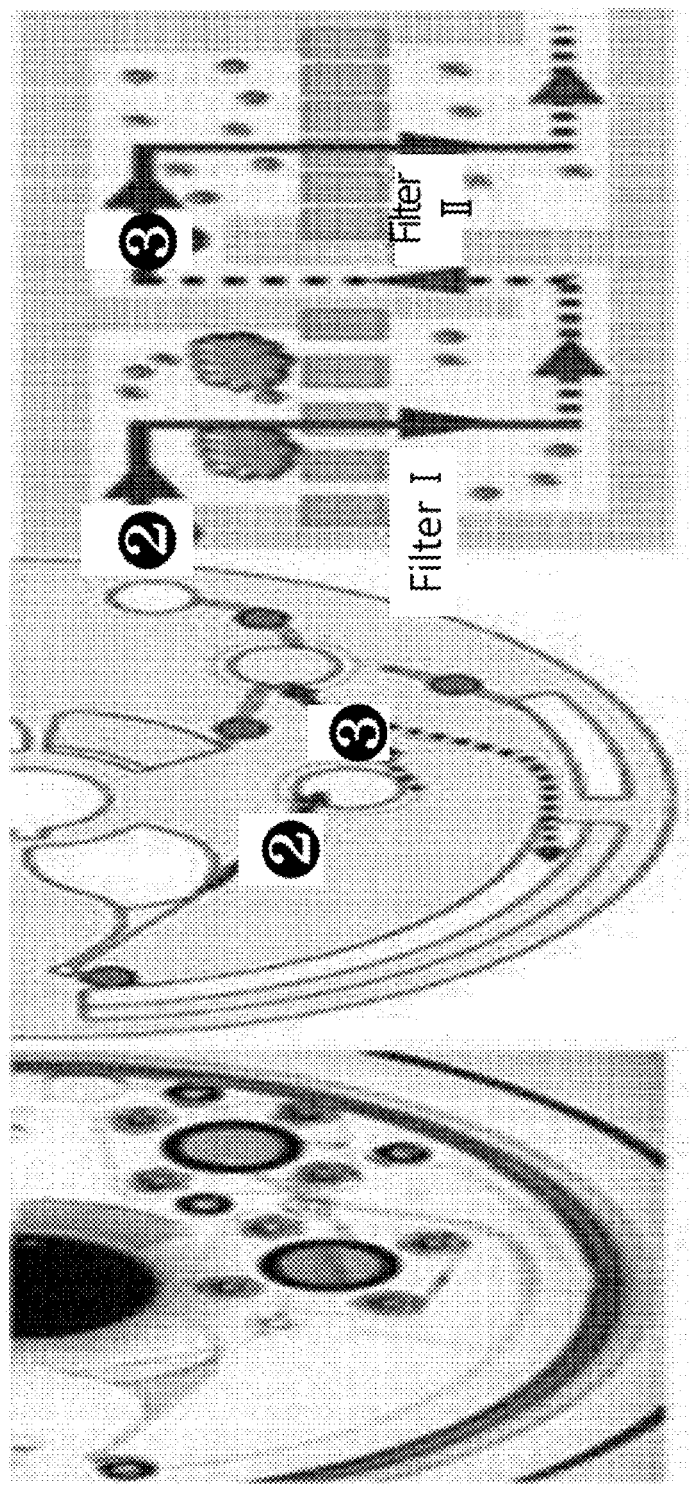
Figure 4C:
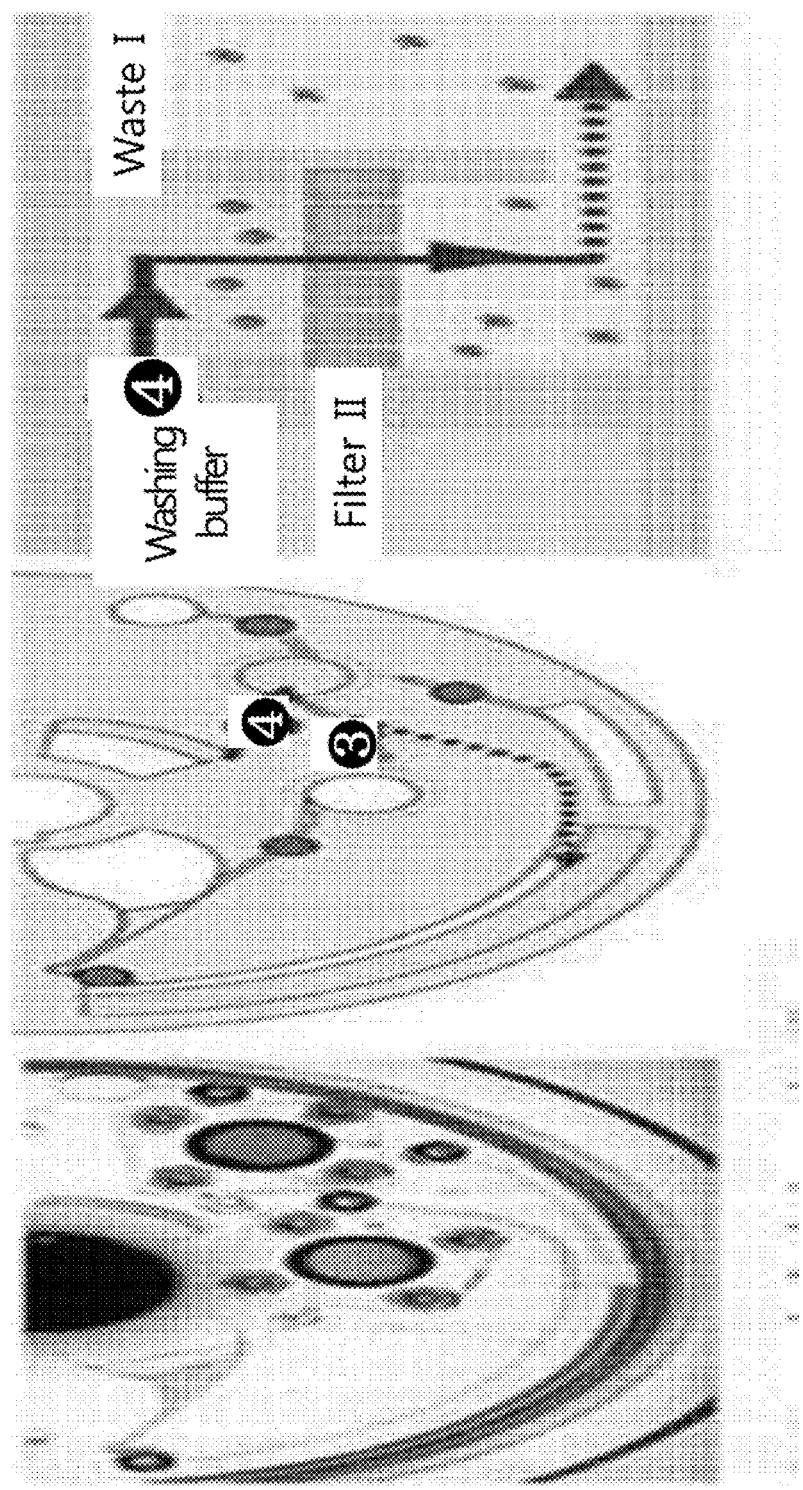
Figure 4D:
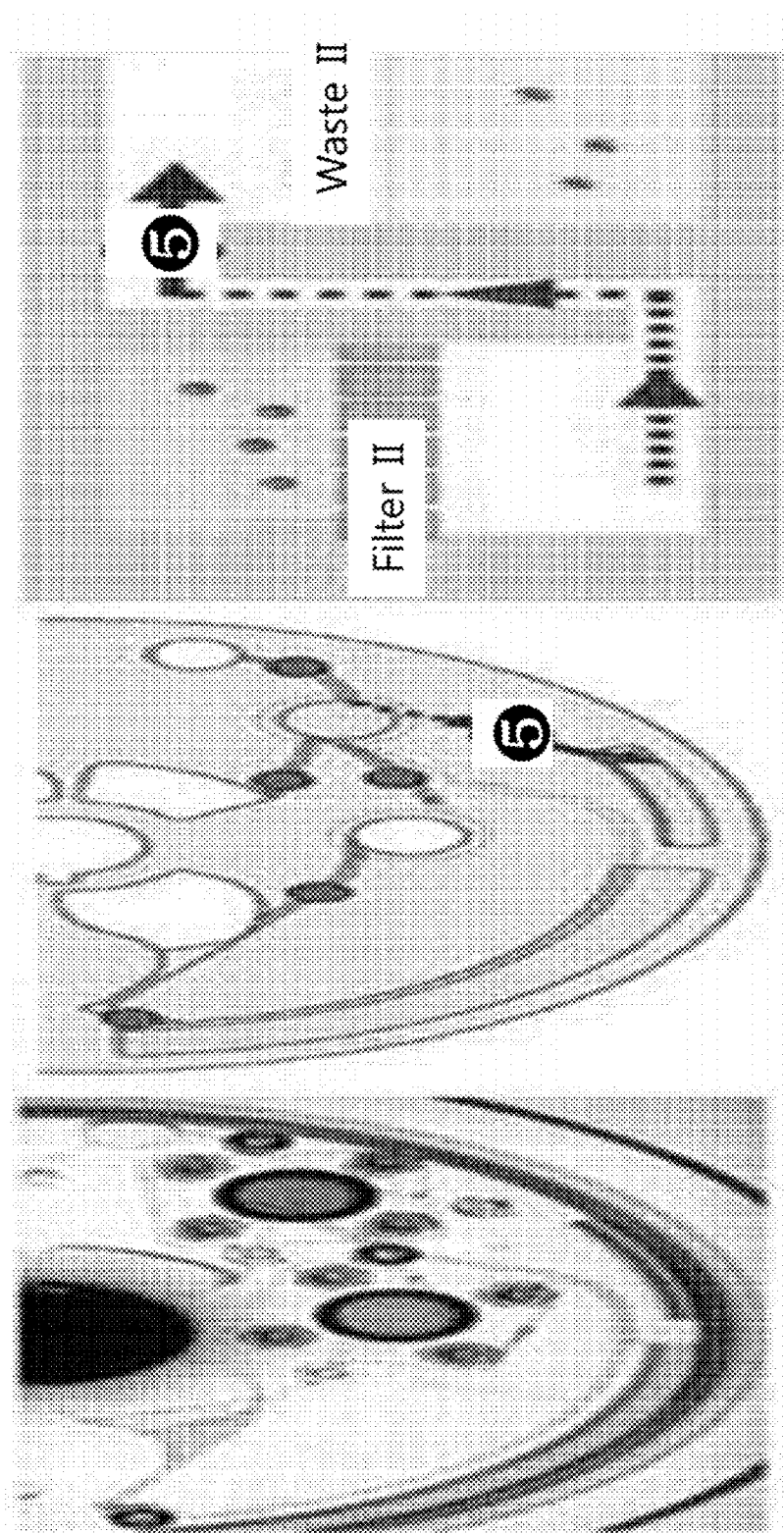
Figure 4E:
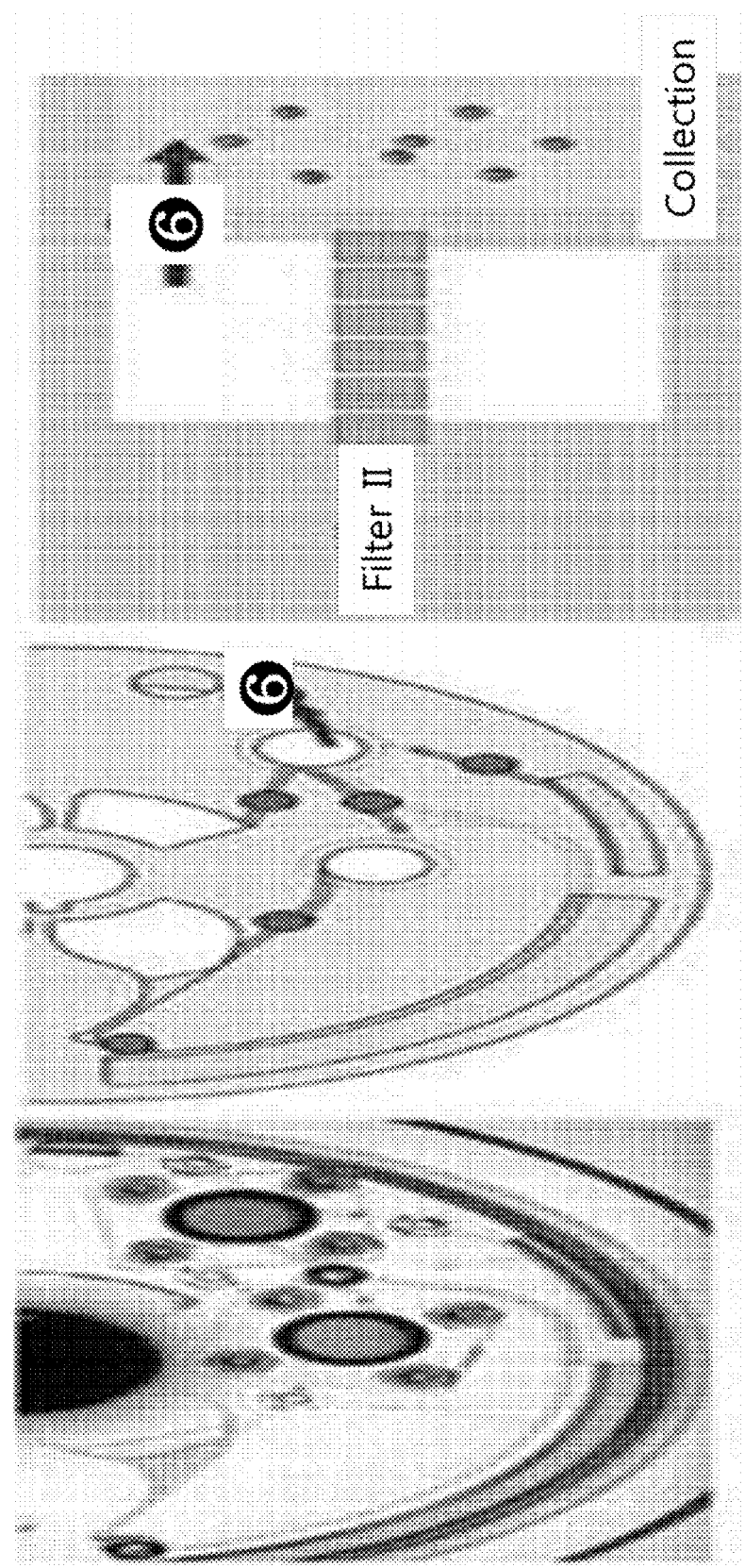

A filtration membrane of the nanoparticle separation apparatus 10 may include a filtration membrane formed of anodic aluminum oxide, and as illustrated in FIG. 3*d*, the filtration membrane of anodic aluminum oxide has higher porosity and pores with a relatively uniform diameter as compared to those of other materials.

Meanwhile, processes for separating nanovesicles may be automatically performed. At this time, for automation of all the processes, the nanoparticle separation apparatus 10 may further include a control system configured to control opening/closing of the valve 700 and a rotation speed and direction of the housing part 100.

More specifically. FIG. 4 illustrates a state in which the nanoparticle separation apparatus 10 according to an embodiment of the present invention is used. As illustrated in FIG. 4, to use the nanoparticle separation apparatus 10 according to an embodiment of the present invention, first, a sample (maximum 1 ml) and a buffer (600 µl) are loaded in the sample accommodation part 200 and the washing chamber unit 600. Subsequently, when the housing part 100 is rotated at a rotation speed of 3,000 rpm, impurities of the sample are precipitated in an inclined chamber (see FIG. 4*a*), and then the second valve 720 is opened to allow a clear supernatant to be filtered through the first filter part 310 and the second filter part 320 to be transferred to the waste liquid accommodation part 400-1 (see FIG. 4*b*). Thereafter, during the filtration process, large particles are filtered through the first filter part 310 having a diameter of 600 nm, and a non-blood vessel protein passes through the second filter part 320 having a diameter of 20 nm to be removed, and eventually, only nanovesicles are concentrated on the second filter part 320. Afterwards, the third valve 730 is closed, and the fourth valve 740 is opened to allow a washing buffer from the washing chamber unit 600 to flow through the second filter part 320, followed by washing (see FIG. 4*c*), and then the fifth valve 750 is opened, and when the housing part 100 is rotated at a rotation speed of 1,500 rpm, a solution remaining in a lower portion of the second filter part 320 is completely transferred to the waste liquid accommodation part 400-2 (see FIG. 4*d*). Lastly, the sixth valve 760 is opened, and when the housing part 100 is rotated at a rotation speed of 1,500 rpm, concentrated vesicles filtered through the second filter part 320 are moved to the particle collector 800 (see FIG. 4*e*). Due to this, nanovesicles may be separated using a low centrifugal force within a short period of time.

As shown in Table 1 below, as a result of comparing the separation method of the present invention, a conventional ultracentrifugation method, and a commercial kit, it can be confirmed that the conventional method requires a lot of time for using an ultracentrifuge or a precipitation reagent and performing several processes for sample processing, whereas, in the case of the nanoparticle separation apparatus 10 including separated filter parts, an overall operation time is 30 minutes or less and a G force operation range is significantly lower than that in the ultracentrifugation method and the commercial kit.

TABLE 1

| A<br>Perform ultracentrifugation | B<br>Commercial kit (Exo-spin) | C<br>Disc operation |
|---|---|---|
| Total operation time: ~6 hours<br>Maximum G force:. 150,000 G<br>Process 1. Centrifugation<br>(300 G, 10 min)<br>Process 2. Ultracentrifugation<br>(20,000 G, 30 min, 4° C.)<br>Process 3. Ultracentrifugation<br>(50,000 G, 1 hour, 4° C.)<br>Process 4. Ultracentrifugation<br>(150,000 G, 2 hours, 4° C.)<br>Process 5. Washing<br>(150,000 G, 2 hours, 4° C.) | Total operation time: ~4 hours<br>Maximum G force: 16.000 G<br>Process 1. Centrifugation<br>(300 G, 10 min)<br>Process 2. Centrifugation<br>(16,000 G, 30 min)<br>Process 3. Incubation<br>(1 hour, 4° C.)<br>Process 4. Centrifugation<br>(16,000 G, 1 hour, 4° C.)<br>Process 5. Washing<br>(50 G, 10 min) | Total operation time: ~30 min<br>Maximum G force: 500 G<br>Process 1. Sample processing<br>(2 min)<br>Process 2. Sample separation<br>(15 min)<br>Process 3. Washing (10 min) |

Hereinafter, example embodiments will be described to aid in understanding of the present invention. However, the following examples are provided to more easily understand the present invention and are not intended to limit the scope of the present invention.

Figure 5A:
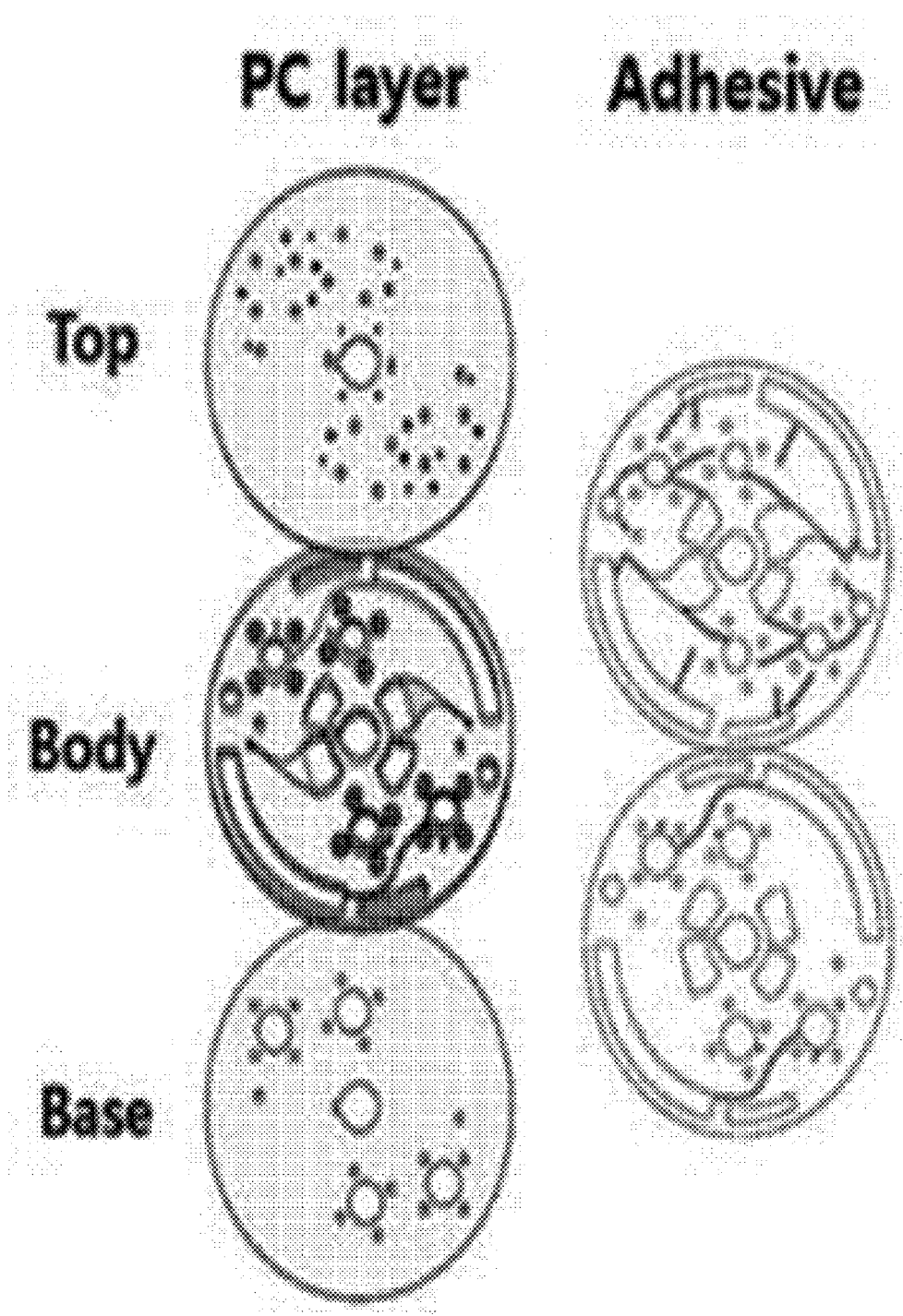
Figure 5B:
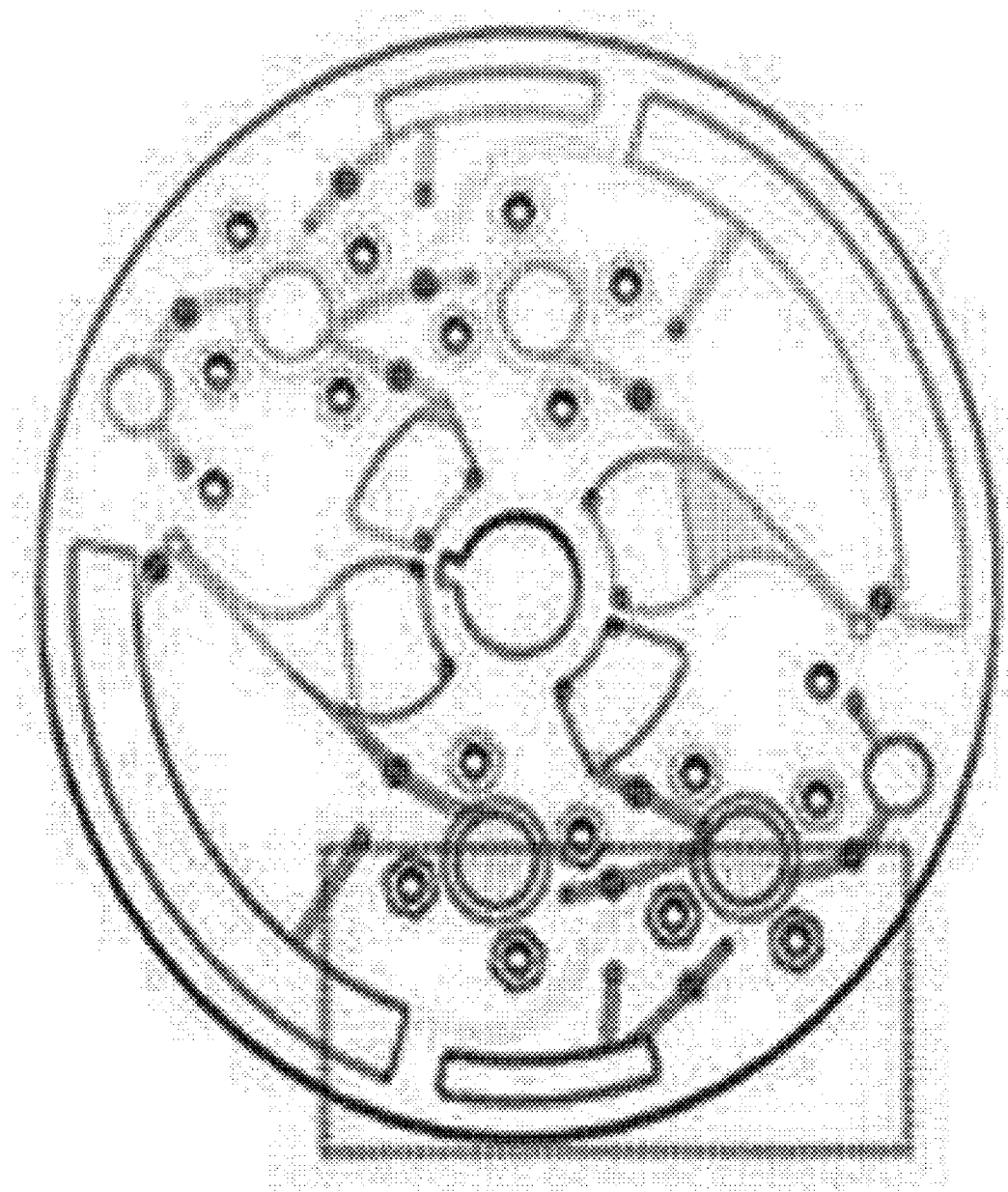
Figure 5C:
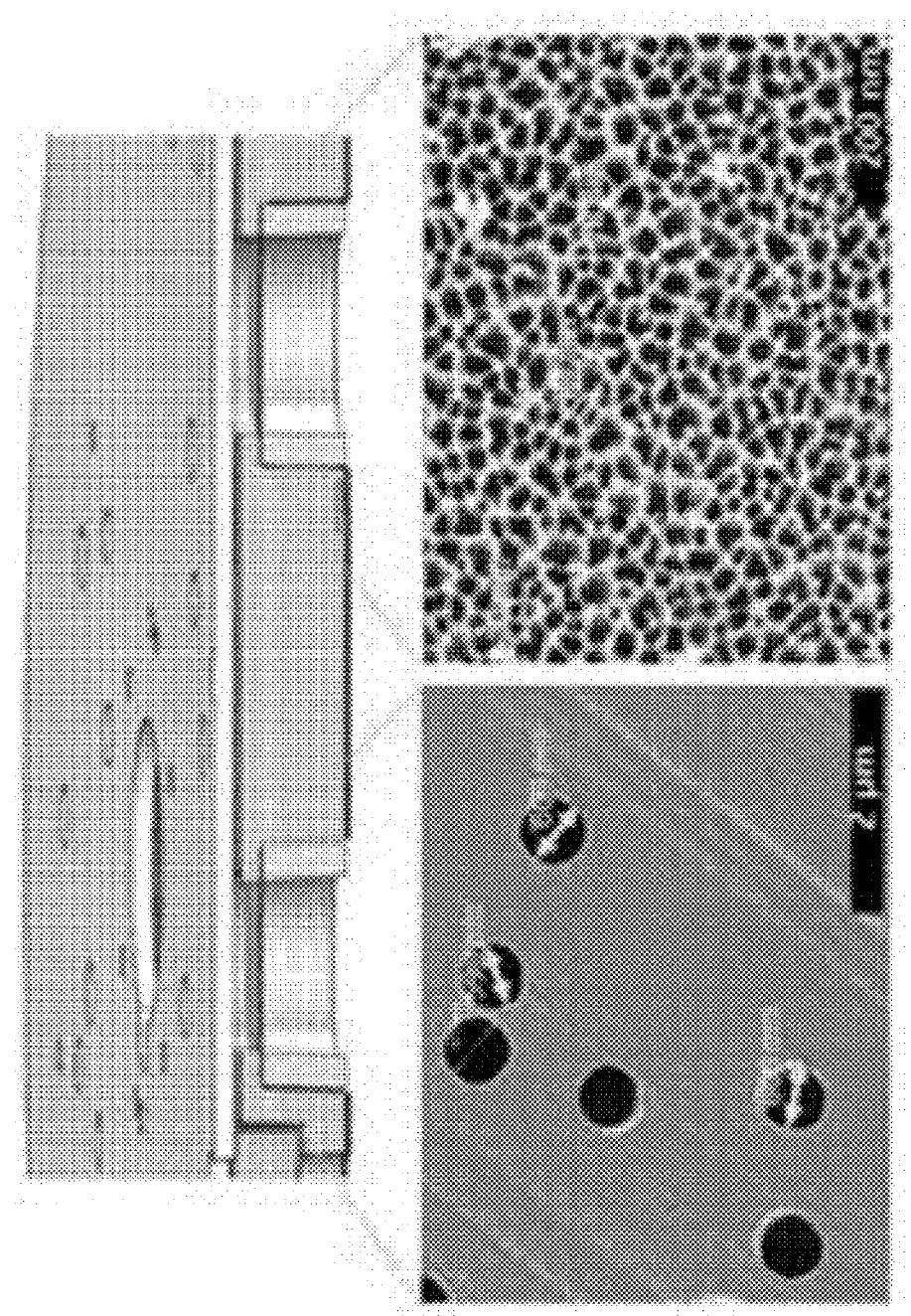

Example 1. Experiment Preparation 1-1. Manufacture of Nanoparticle Separation Apparatus According to Present Invention To manufacture a microfluidic device according to the present invention, the microfluidic device was designed using a 3D CAD program, and manufactured using a CNC milling machine. More specifically, a nanoparticle separation apparatus was processed into a top layer, a body layer, and a base layer by using polycarbonate (PC, manufactured by I-Components Co. Ltd, Korea) according to the design (see FIG. 5). When processing was completed, all the layers were laminated using two sheets of pressure-sensitive paper, a dual-sided adhesive (DFM 200 clear 150 POLY H-9V-95, FLEXcon, USA), and a customized compression machine. Meanwhile, a valve according to one embodiment of the present invention may be disposed on the top layer, and may be automatically opened or closed by an external signal according to need. According to general procedures for manufacturing a commonly known lab-on-a-disc fused with a membrane filter, as described above, each layer is processed according to computer numerical control, and a surface on the opposite side of a filtration chamber unit according to one embodiment of the present invention was carved to insert commercially available membranes such as a track-etched PC membrane (SPI, 13 mm, pore diameter of 0.6 µm) and an anodic aluminum oxide membrane (Whatman, 13 mm, and 0.02 µm) as filter I and filter II, respectively.

Figure 6A:
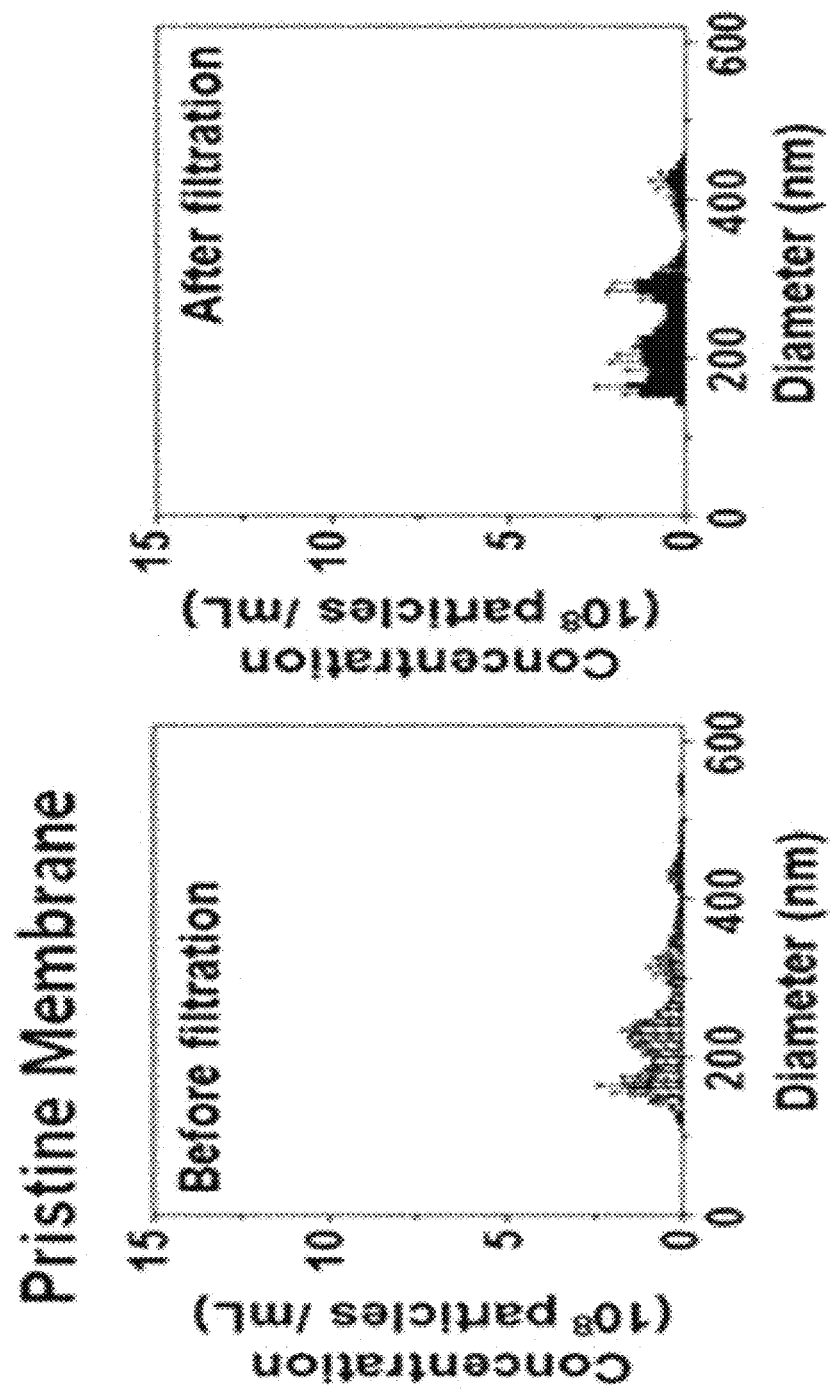
FIGS. 6a and 6b illustrate measurement results of a degree of recovery of vesicles, obtained by coating a nanoparticle separation apparatus according to an embodiment of the present invention with a pluronic solution.
Figure 6B:
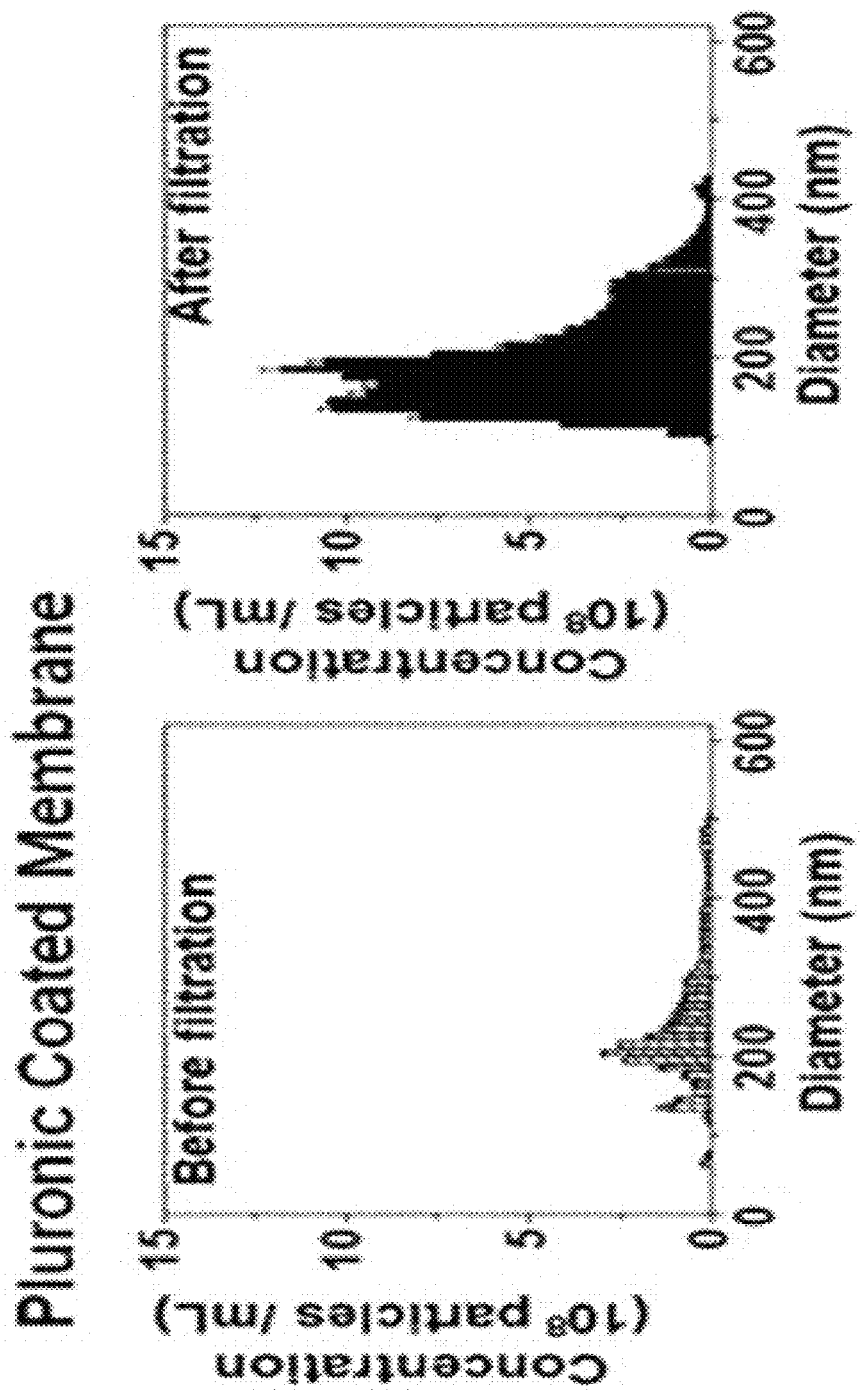

Meanwhile, to obtain non-specific adsorption and maximum yield of nanovesicles, all chambers and channels were coated with a 1% pluronic solution (PEO-PPO-PEO block copolymer) (see FIG. 6). More specifically, all the chambers and channels were allowed to react with a 1% pluronic solution for 1 hour, followed by removal of the pluronic solution and washing with a PBS buffer.

1-2. Cell Culture

LNCaP cells, which are a prostate cancer cell line, were grown in an RPMI medium (Gibco, UK) supplemented with 10% exo-free FBS (System Biosciences Inc., CA), and a 1% antibiotic/antifungal agent, in an incubator at 5% $CO_2$ and 37° C. A cell culture supernatant was collected after 24 hours, and extracellular vesicles were collected according to description in each protocol.

1-3. Storage and Treatment of Clinical Sample

Similar to bladder cancer patients, urine samples of healthy donors were collected according to the Institutional review board guidelines, and first urine (15 ml) was collected from bladder cancer patients. The collected urine samples were stored at −80° C. until use.

To separate nanovesicles, the samples were thawed and used at room temperature (RT), each of 5 ml of the urine samples was used to separate extracellular vesicles by ultracentrifugation (UC) and Exo-spin, and 400 µl of urine was used to separate nanovesicles in a nanoparticle separation apparatus according to the present invention.

Example 2. Verification of Separation Effects Using Mixed Solution of Nanobeads and Urine 2-1 Verification of Disc Operation Effect According to Filter Combination To verify an effect of a nanoparticle separation apparatus according to the present invention according to filter diameter combinations, an experiment was carried out according to a sized-based combination of filters.

Figure 7A:
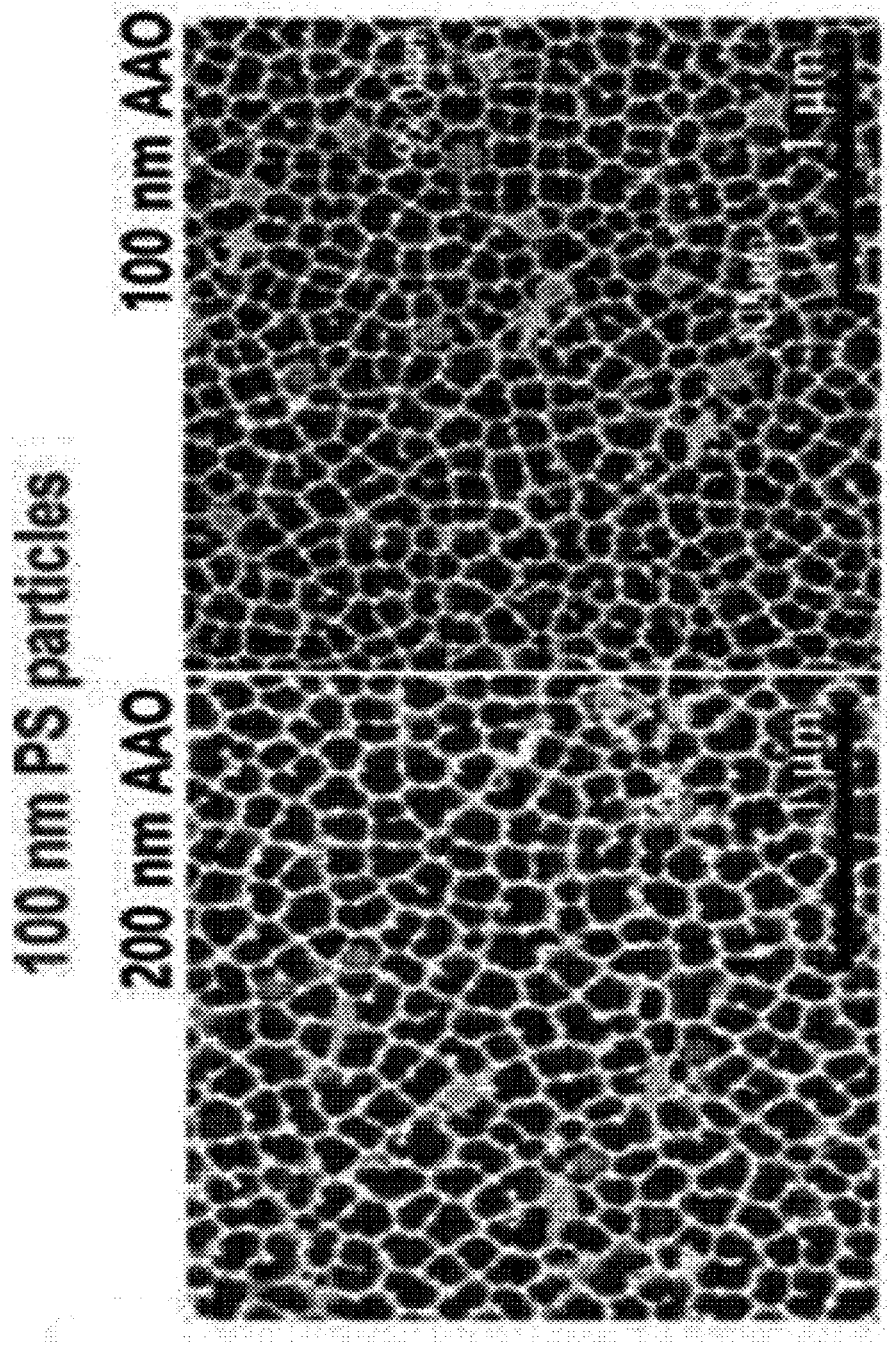
Figure 7B:
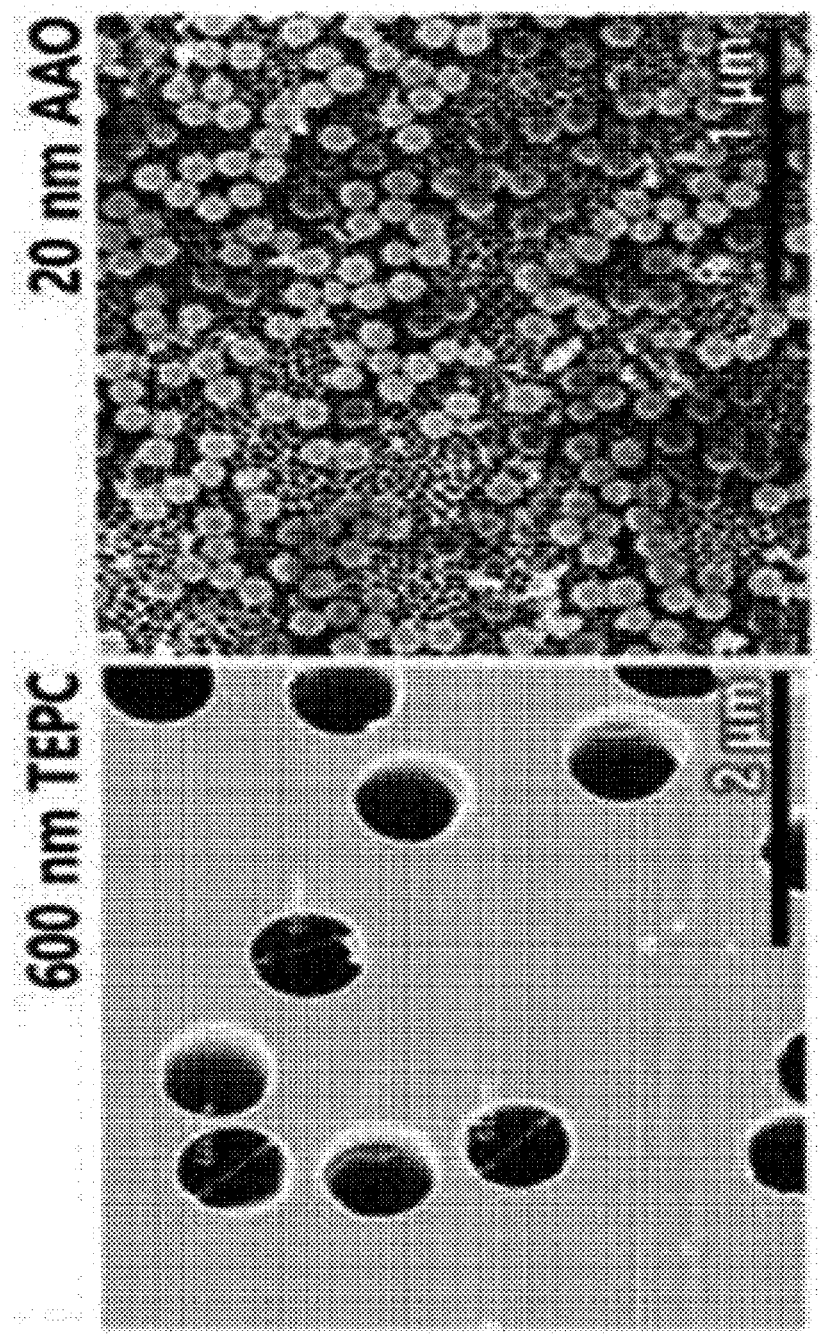

More specifically, when a 200 nm AAO membrane as filter I and a 20 nm membrane as filter II were combined, as illustrated in FIG. 7a, most 100 nm PS nanoparticles were stuck in the 200 nm diameter, and thus PS nanoparticles could not be found on the 20 nm filter. Next, in the case of a combination of 600 nm and 100 nm filters, nanoparticles passed through the 600 nm filter, whereas a large amount of particles were present on the 100 nm filter, but the particles were not recovered. Lastly, when 600 nm and 20 nm filters are combined, a high recovery rate of PS nanoparticles was confirmed (see FIG. 7b).

Next, a size-selective separation performance experiment according to the size of the filters was carried out using a mixed solution of 800 nm and 100 nm PS nanoparticles.

Figure 7C:
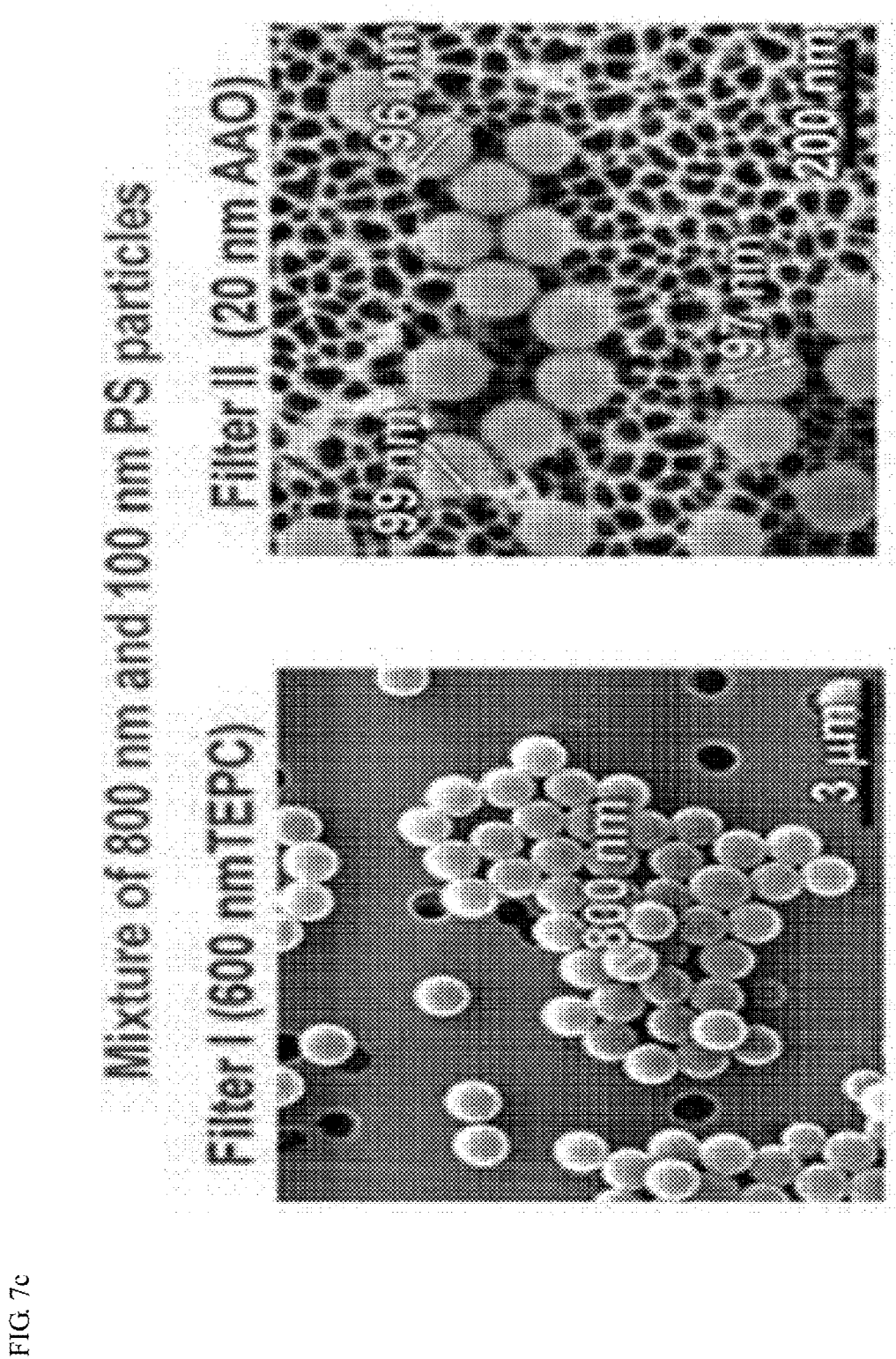

More specifically, as a result of operating a disc by using a combination of the 600 nm and 20 nm filters and a mixed solution of 800 nm and 100 nm PS nanoparticles, as illustrated in FIG. 7c, it was confirmed that 800 nm nanoparticles were filtered without passing through filter I, and only 100 nm nanoparticles were located and concentrated on filter II.

In the present embodiment, the size and concentration of nanoparticles were analyzed by tracking the nanoparticles through nanoparticle tracking analysis (NTA).

Figure 8A:
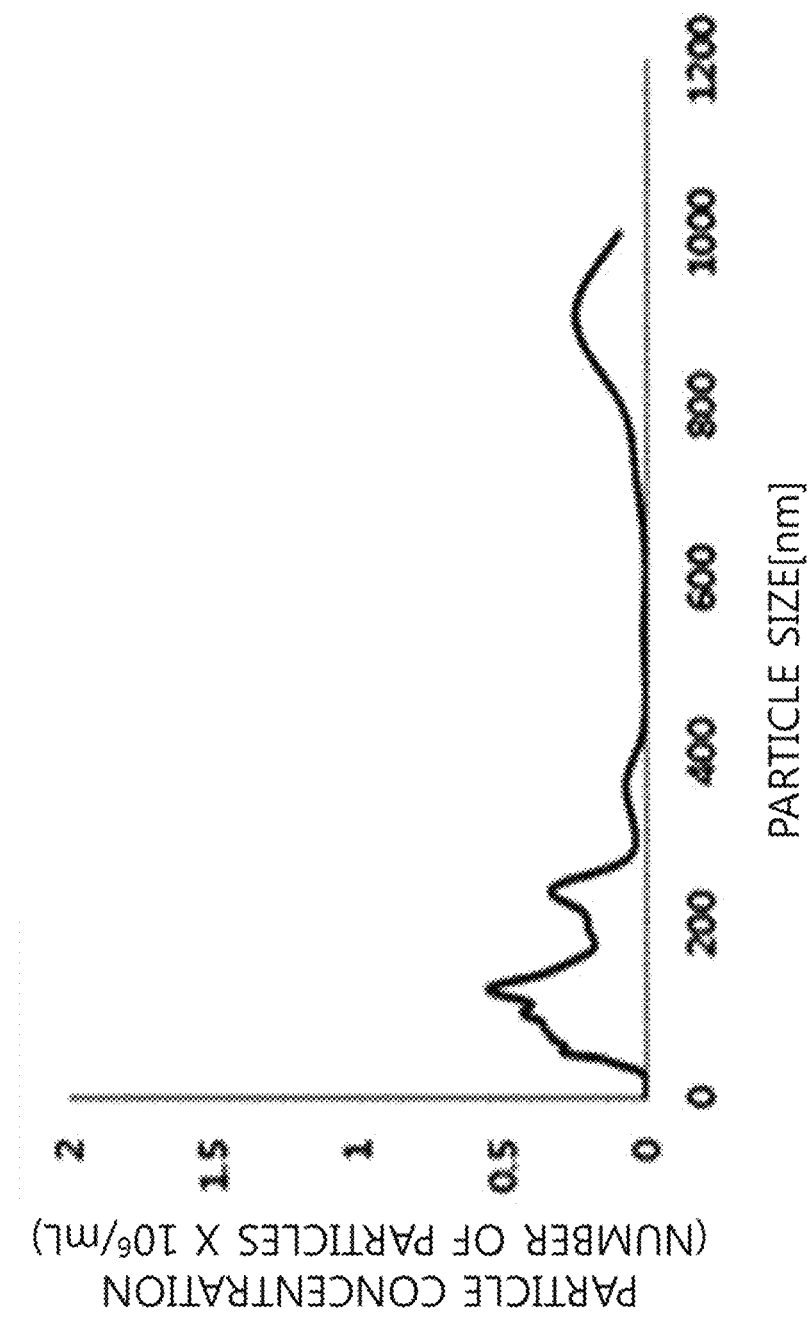
FIGS. 8a-8c illustrate analysis results of the size and concentration of nanoparticles in a solution prepared by mixing 100 nm and 80 nm nanobeads, obtained by nanoparticle tracking analysis (NTA).
Figure 8B:
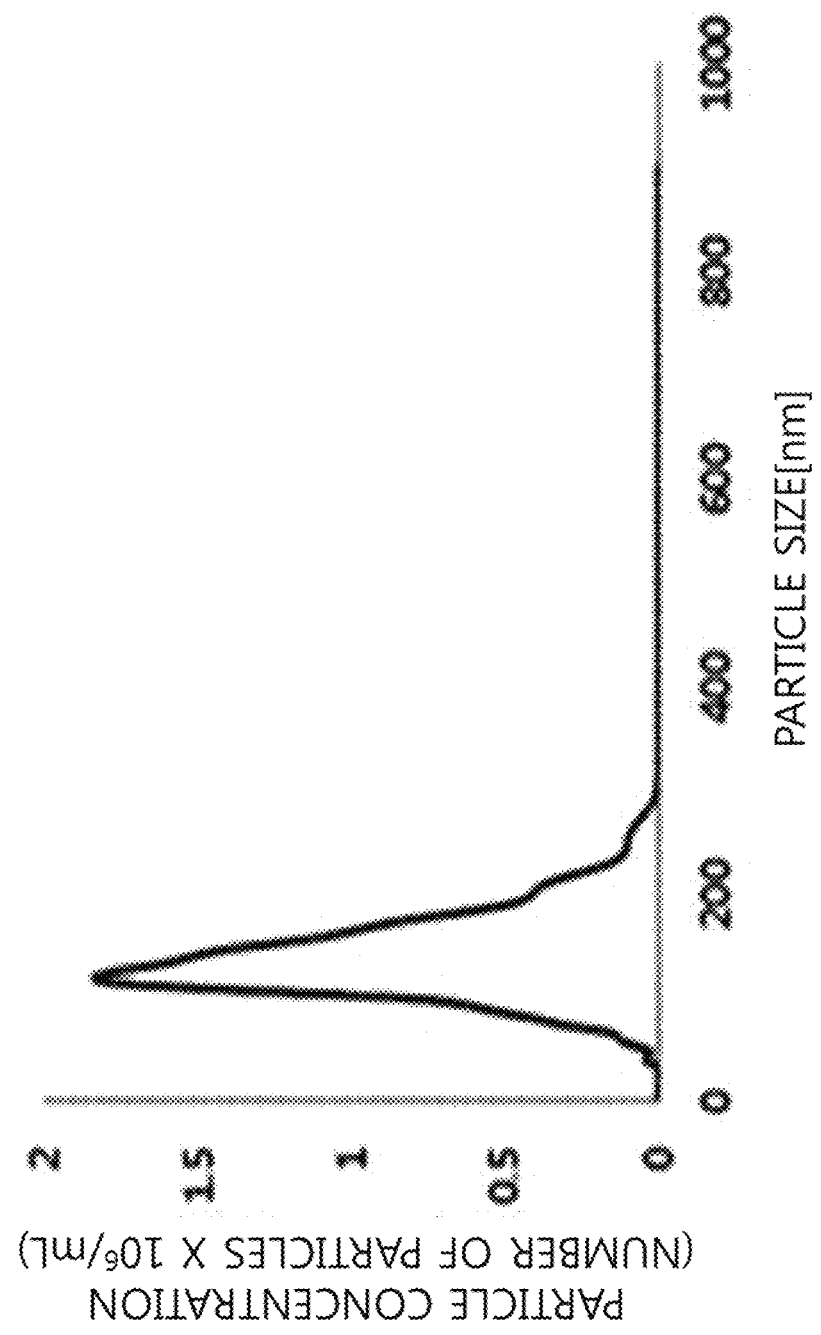
Figure 8C:
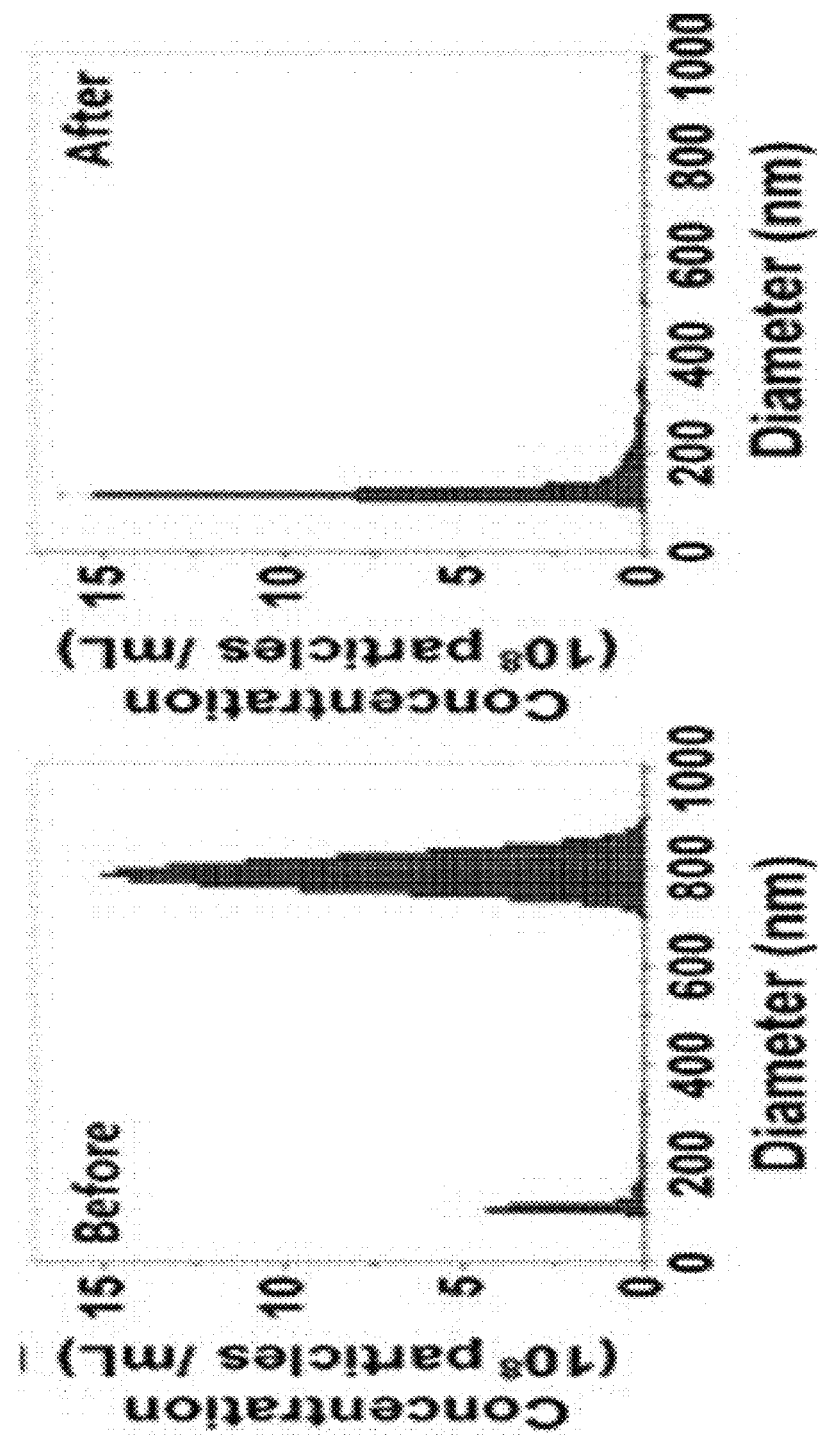

FIG. 8 illustrates experimental data showing that, as a result of performing a disc experiment on a mixed solution of 100 nm and 800 nm nanobeads, 100 nm particles were filtered, wherein the mixed solution including both 100 nm particles and 800 nm particles exhibited a low concentration value (see FIG. 8a), whereas, as a result of operating the disc, only 100 nm nanobeads were detected in a filter and shown to be concentrated (see FIGS. 8b and 8c).

2-2. Verification of Capability of Performing Concentration of Extracellular Vesicles After confirming a separation effect of a disc according to PS nanoparticles with different sizes according to Example 2-1, a capability of the disc to perform the concentration of CCS and extracellular vesicles from urine samples was evaluated.

Figure 9A:
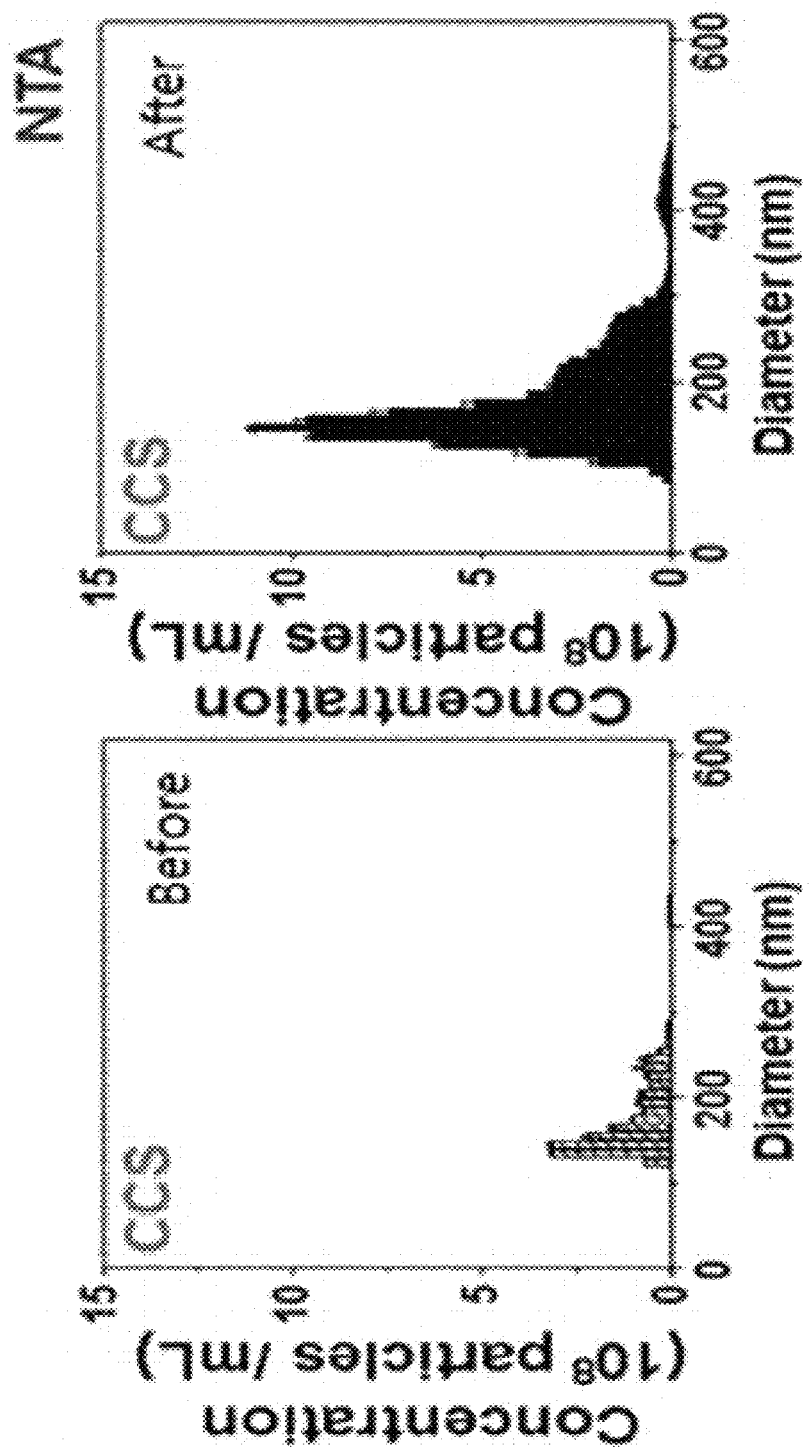
Figure 9B:
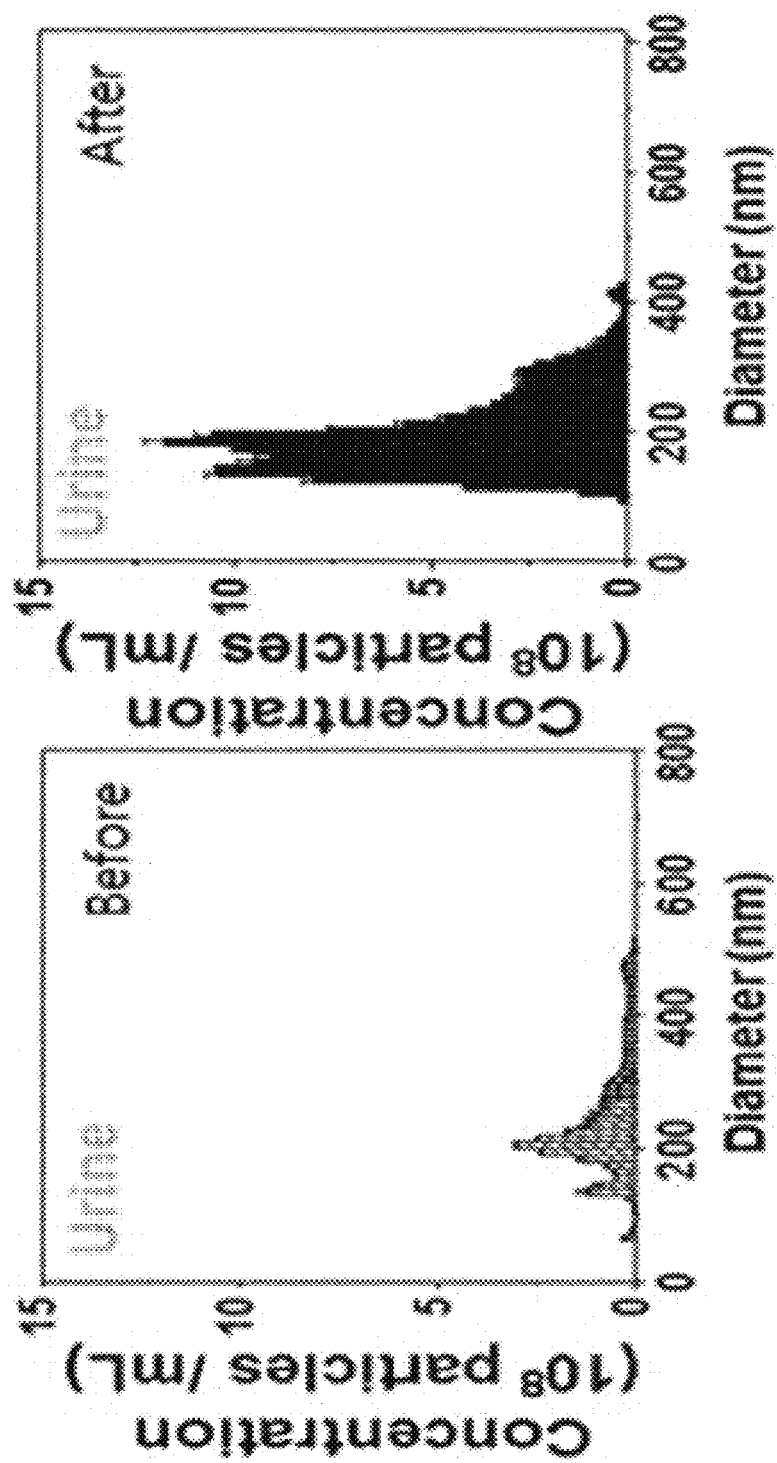

More specifically, as a result of performing concentration analysis through NTA by performing a disc experiment on 1 ml of CCS or urine samples of bladder cancer patients, as illustrated in FIGS. 9a and 9b, a higher concentration, i.e., about 5-fold that before performing the disc experiment was shown.

Figure 9C:
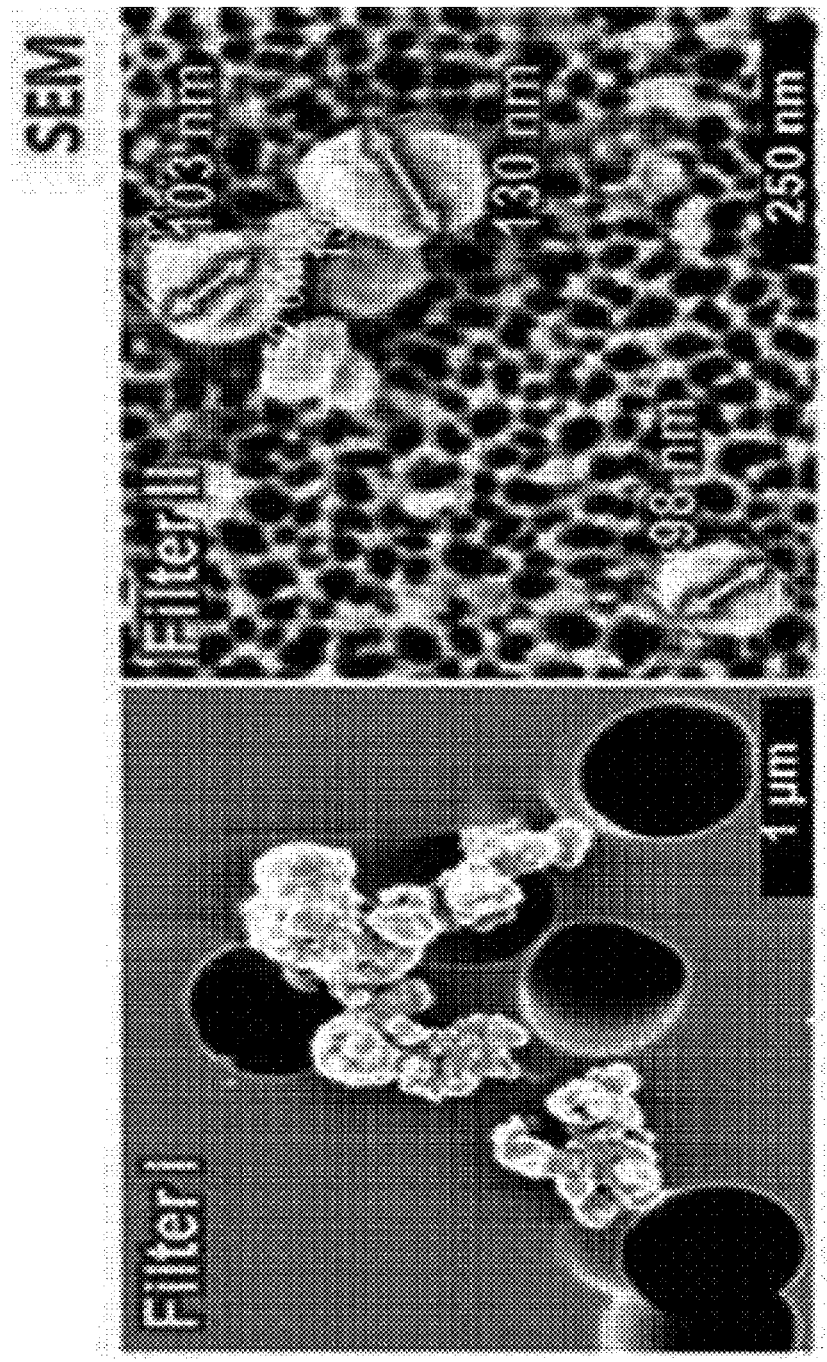
Figure 9D:
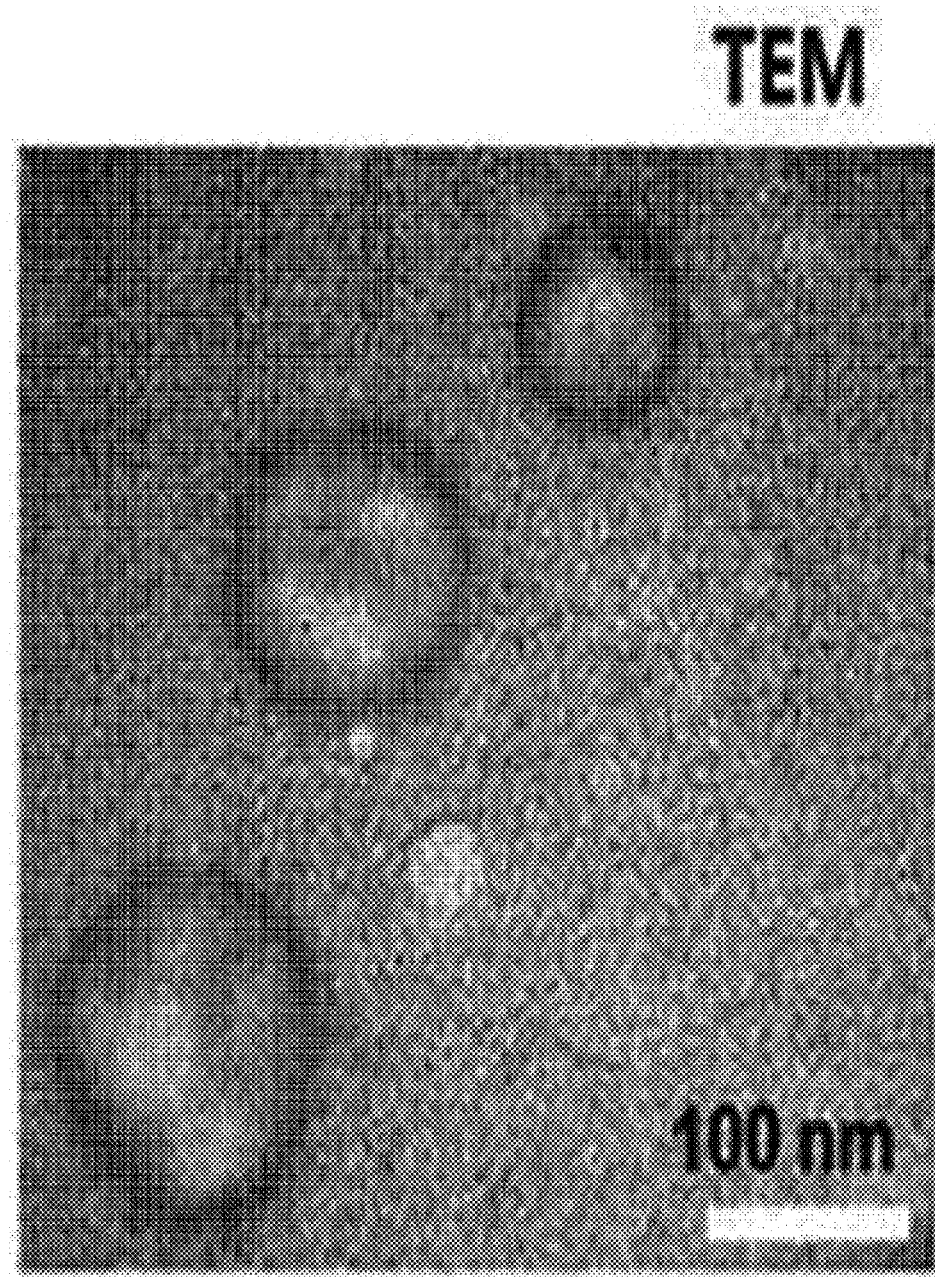

FIG. 9c illustrates verification results showing that, actually, large impurities were filtered on filter I, and extracellular vesicles of the urine samples of bladder cancer patients were filtered through filter II FIG. 9d illustrates verification results showing that nanovesicles were recovered in a circular shape.

Figure 10A:
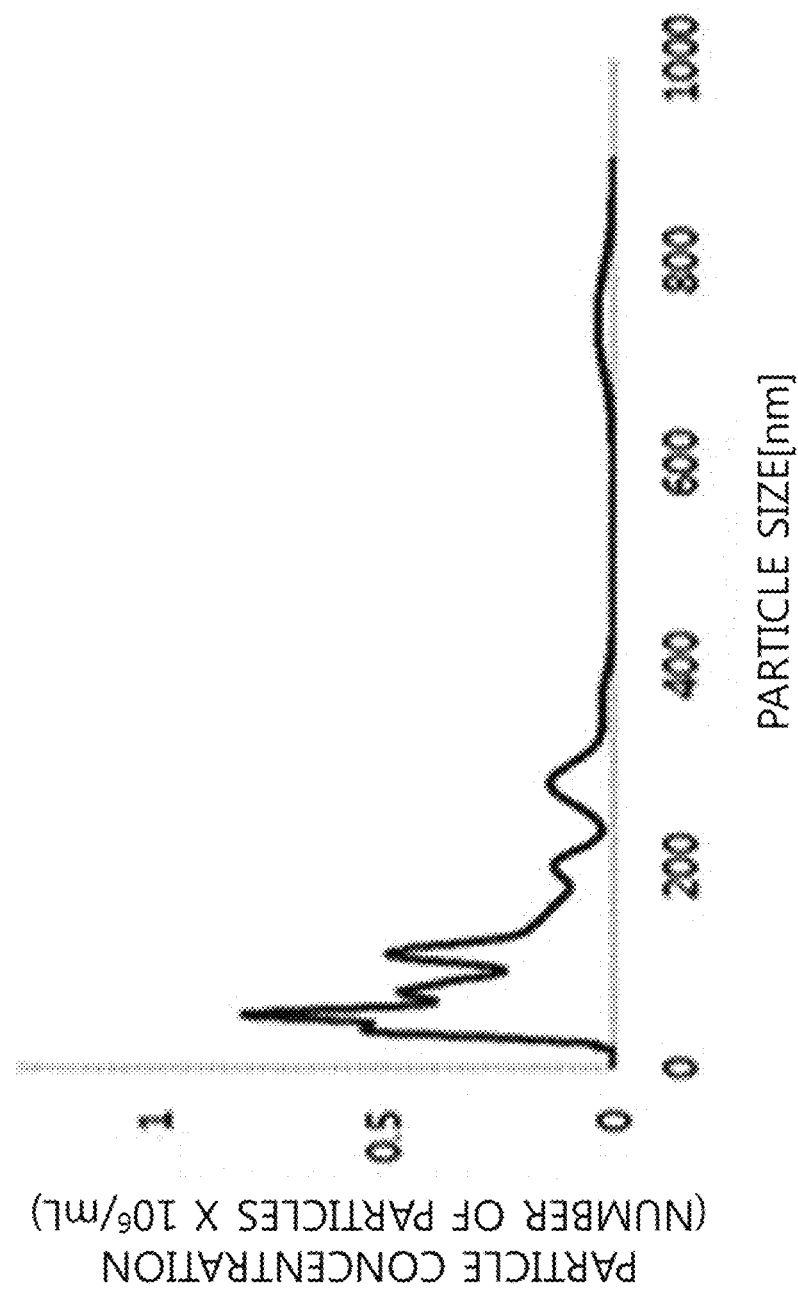
FIGS. 10a and 10b illustrate analysis results of the size and concentration of nanovesicles having a size between 30 nm and 600 nm in 1 mL urine, obtained by nanoparticle tracking analysis (NTA).
Figure 10B:
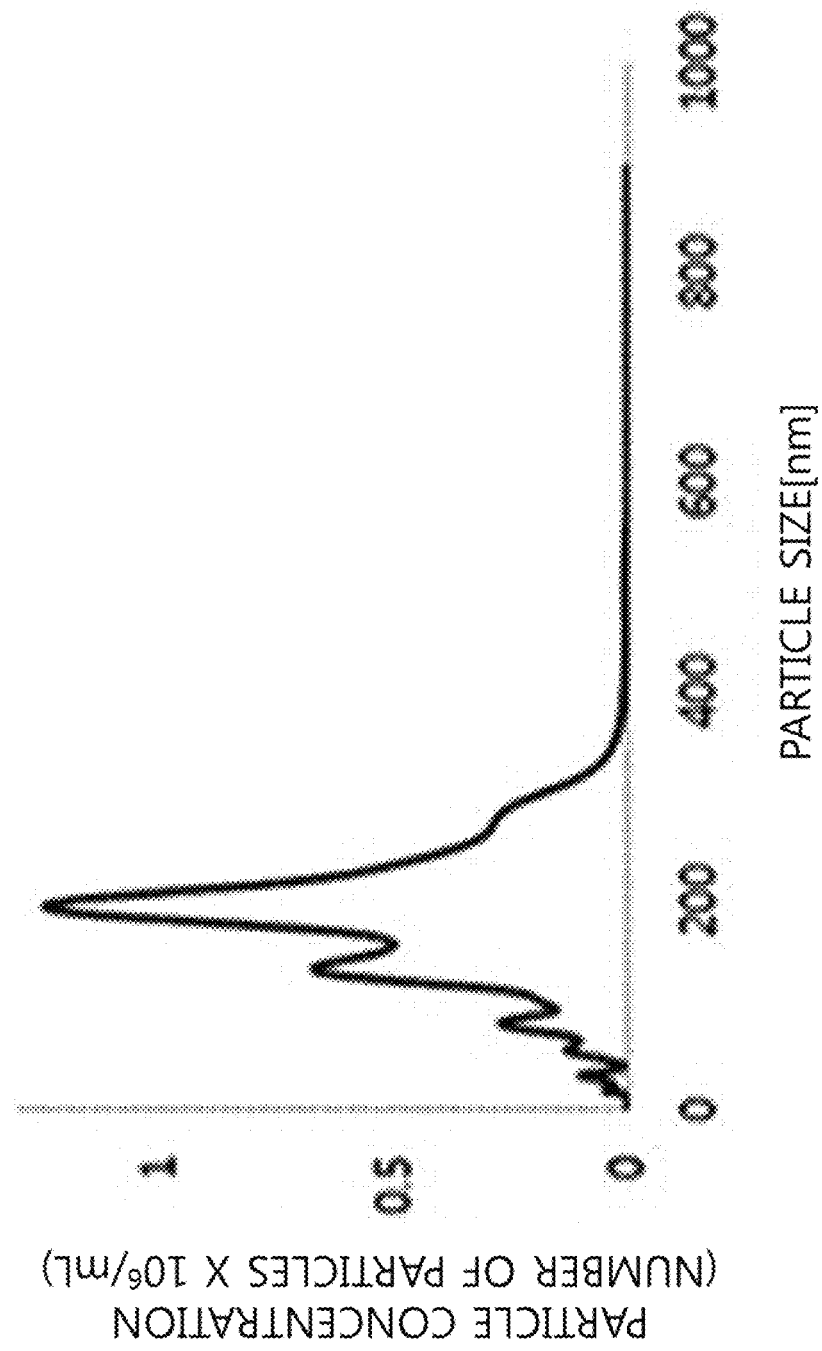

FIG. 10 illustrates experimental data showing that, as a result of performing a disc experiment, nanovesicles having a size between 30 nm and 600 nm from 1 mL of urine were actually filtered, wherein various sizes of particles were observed in the urine (see FIG. 10a), whereas, as a result of performing a disc experiment, the nanovesicles having a size between 30 nm and 600 nm were detected in a filter and shown to be concentrated, and a total separation time was within 40 minutes (see FIG. 10b).

Example 3. Vesicle Separation and Quantitative Comparison Analysis According to Vesicle Separation Method To confirm a difference in a vesicle separation effect between a separation method using a nanoparticle separation apparatus according to the present invention and a conventional vesicle separation method, an experiment was carried out using ultracentrifugation, Exo-spin, and the method using a nanoparticle separation apparatus according to the present invention.

3-1 Separation of Vesicles According to Ultracentrifugation

Ultracentrifugation (UC) was performed at 300×g for 10 minutes to remove cell debris of the sample obtained through Example 1-3. Subsequently, centrifugation was performed on a supernatant at 20,000×g for 30 minutes, and the resulting pellet was discarded. Next, the supernatant was transferred to an 80 ml polypropylene ultracentrifuge tube, followed by centrifugation in a Ti45 fixed angle rotor at 4° C. and 50,000×g for 1 hour. The pellet obtained as a result of the centrifugation was discarded, and the supernatant was transferred to a new ultracentrifuge tube, followed by centrifugation in a Ti45 fixed angle rotor at 4° C. and 150,000×g for 2 hours, to collect a vesicle pellet. Subsequently, the supernatant was discarded, and the pellet was re-suspended with 1 ml of 10 nm pre-filtered PBS and transferred to a 1 ml polycarbonate ultracentrifuge tube, followed by centrifugation in an MLA-130 fixed angle rotor at 4° C. and 150,000×g for 2 hours. The resulting pellet was re-suspended with 1 ml of 10 nm pre-filtered PBS, and stored at 4° C. for immediate use or stored at −80° C. for long-term storage.

3-2. Separation of Vesicles Using Exo-Spin Exosome Purification Kit

As described above in Example 3-1, to confirm a difference in a vesicle separation effect between a separation method using a nanoparticle separation apparatus according to the present invention and a conventional vesicle separation method, an experiment for vesicle separation was carried out using an Exo-spin exosome purification kit.

More specifically, to remove cell debris of the sample obtained through Example 1-3, centrifugation was performed at 300×g for 10 minutes to obtain a supernatant, and the supernatant was centrifuged at 20,000×g for 30 minutes and the resulting pellet was discarded. The supernatant was gently mixed with a half amount of buffer A, and a mixture cultured at 4° C. overnight was centrifuged at 20,000×g for 1 hour to produce a pellet, and the pellet was re-suspended with 100 µl of PBS provided along with the kit. A Vesicle pellet was purified using a spin column provided according to manufacturer's instructions to separate vesicles, and 200 µp of the separated vesicles were stored at 4° C. for immediate use/short-term storage, or stored at −80° C. for long-term storage.

3-3. Separation and Quantification of Vesicles According to Nanoparticle Separation Apparatus According to Present Invention An experiment for vesicle separation was carried out using a nanoparticle separation apparatus according to an embodiment of the present invention. More specifically, large particles or cell debris in a sample (urine or complex medium) was precipitated at 300×g for 2 minutes, and a clear supernatant was transferred to a filtration chamber unit to be filtered through filter I and filter II at 500×g for 15 minutes. Filter II was washed with a PBS solution at 500×g for 10 minutes, and then the filtered sample solution was discharged to waste liquid accommodation part 2. At this time, vesicles filtered through filter II (~100 µl) were transferred to a particle collector, and filter II was washed with 100 µl of PBS. A solution containing the vesicles transferred to the particle collector was used for additional analysis.

Example 4. Enzyme Linked Immunosorbent Assay (ELISA)

To compare separation effects with each other according to each vesicle separation method, a vesicle solution according to the separation method of Example 3 was analyzed using ELISA.

The vesicle solution was prepared by maintaining the same input capacity for the three separation methods of Example 3, a plate was coated with an antibody (anti-CD9 antibody, MEM61, Abcam, MA, US) at 4° C. overnight, and then blocked with a 1% BSB-PBS buffer at 37° C. for 1 hour. Subsequently, the resulting plate was washed with a 0.1% BSA-PBS buffer (washing buffer), followed by culturing in 100 µl of a PBS buffer together with the vesicle solution at 37° C. for 1 hour, and then the solution was removed, and the plate was washed twice with a washing buffer. At this time, after washing three times using a washing buffer, a biotin-conjugated detection antibody solution (anti-CD81 antibody, biotin, LifeSpan Biosciences, INC, WA, US) diluted with a PBS buffer (100 µl, 500 ng/ml) was added to the resulting plate, followed by culturing in a room for 1 hour. After washing the plate three times with a washing buffer, the plate was incubated together with a HRP-conjugated streptavidin solution diluted with a PBS buffer (100 µl, 1:1000 in PBS) at room temperature (RT) for 30 minutes. Thereafter, 100 µl of a TMB solution was added to the plate, followed by culturing in a room for 15 minutes, and lastly, 50 µl of a termination solution was added to each of a plurality of wells to terminate a reaction, and then absorbance of the solution was measured at 450 nm using a plate reader spectrophotometer (TECAN).

Example 5. Confirmation of Vesicle Separation Results

Efficiencies according to each vesicle separation method through the above examples were compared and analyzed. More specifically, nanovesicles were separated using the three methods by using 1 ml of LNCaP CCS.

Figure 11:
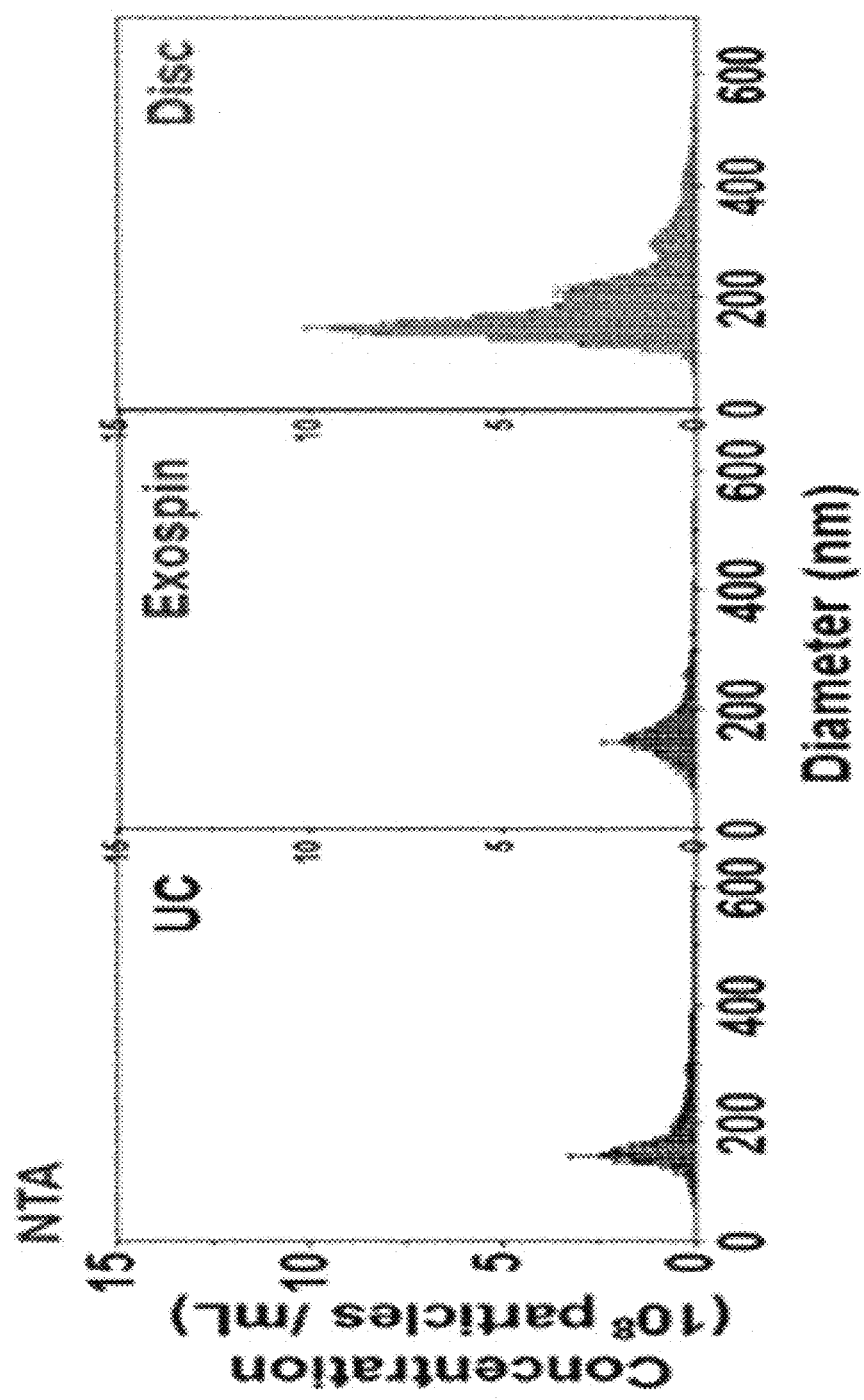

As a result of NTA, as illustrated in FIG. 11, nanovesicles separated using a nanoparticle separation apparatus according to the present invention exhibit a high concentration yield.

More specifically, as illustrated in FIG. 11, it was confirmed that the concentrations of detected extracellular vesicles were 1.33±0.07, 1.32±0.06, and 7.67±1.5×10$^9$ particles/ml, respectively and a recovery power of the disc method according to the present invention was 5.8-fold higher than the conventional UC method.

The above description of the present invention is provided only for illustrative purposes, and it will be understood by one of ordinary skill in the art to which the present invention pertains that the invention may be embodied in various modified forms without departing from the spirit or essential characteristics thereof. Thus, the embodiments described herein should be considered in an illustrative sense only and not for the purpose of limitation.

INDUSTRIAL APPLICABILITY

The present invention relates to a nanoparticle separation apparatus and method using a microfluidic device. Specifically, since the apparatus and method are based on low centrifugal force and size, nanovesicles irrelevant to antibody specificity can be separated within a short period of time without using a conventional ultracentrifuge, and by integrating and automating all processes after sample injection, an additional professional workforce is not required and accurate fluid measurement is possible, and, accordingly, the loss of nanovesicles may be reduced.

The invention claimed is:

1. A nanoparticle separation apparatus comprising:
   a rotatable disc-shaped housing;
   a sample accommodation chamber configured to provide a space in which a fluid sample comprising nanoparticles is to be contained;
   a filtration chamber disposed downstream of the sample accommodation chamber, and comprising a filtration membrane that is configured to filter nanoparticles from the fluid sample, wherein the filtration membrane comprises 1 nm to 1 pm pores;
   a waste liquid accommodation chamber disposed downstream of the filtration chamber, and configured to store the filtered fluid sample;
   a particle collector chamber connected to the filtration chamber for collecting the nanoparticles that are in a specific size range filtered by the filtration membrane;
   a plurality of microchannels comprising a first microchannel, a second microchannel and a third microchannel, wherein the filtration chamber is connected to and in fluid communication with the sample accommodation chamber via the first microchannel, wherein the waste liquid accommodation chamber is connected to and in fluid communication with the filtration chamber via the second microchannel, wherein the second microchannel is connected to a lower portion of the filtration chamber, wherein the particle collector chamber is connected to and in fluid communication with the filtration chamber via the third microchannel, wherein the third microchannel is connected to an upper portion of the filtration chamber;

a plurality of valves comprising a first valve configured to open and close the first microchannel, a second valve configured to open and close the second microchannel, and a third valve configured to open and close the third microchannel; and a controller configured to control rotation of the rotatable disc-shaped housing and further configured to control opening and closing of the first valve on the first microchannel, the second valve on the second microchannel and the third valve on the third microchannel, wherein the controller is configured to:

rotate the rotatable disc-shaped housing in a first rotational speed for transferring a portion of the fluid sample to the filtration chamber and filtering the nanoparticles with the filtration membrane, subsequently, close the first valve on the first microchannel and open the second valve on the second microchannel, while the first valve on the first microchannel is closed and the second valve on the second microchannel is open, rotate the rotatable disc-shaped housing in a second rotational speed for discharging waste liquid disposed downstream of the filtration membrane to the waste liquid accommodation chamber and recovering the filtered nanoparticles, wherein the second rotational speed is lower than the first rotational speed and causes the waste liquid to be discharged at a pressure lower than a capillary pressure in the pores of the filtration membrane, subsequently, open the third valve on the third microchannel, and while the third valve is open, further rotate the rotatable disc-shaped housing in a third rotational speed to collect, in the particle collector chamber, the nanoparticles that are (i) in the specific size range filtered by the filtration membrane and (ii) disposed upstream of the filtration membrane in the filtration chamber.

2. The nanoparticle separation apparatus of claim 1, wherein the fluid sample comprises a biological sample selected from the group consisting of urine, blood, saliva, and sputum that include an aqueous solution having various nanoparticles dispersed therein, cell bodies, and rare biological particles.

3. The nanoparticle separation apparatus of claim 1, further comprising a washing chamber configured to provide a space configured to contain a washing solution.

4. The nanoparticle separation apparatus of claim 1, further comprising one or more fasteners configured to fasten the filtration chamber.

5. The nanoparticle separation apparatus of claim 1, wherein the second rotational speed is lower than 3,000 rpm.

6. The nanoparticle separation apparatus of claim 1, wherein the third rotational speed is lower than 3,000 rpm.

7. A nanoparticle separation apparatus comprising:
a rotatable disc-shaped housing;
a sample accommodation chamber configured to provide a space in which a fluid sample is to be contained;
one or more filtration chambers disposed downstream of the sample accommodation chamber, and comprising two or more filtration membranes that comprise a nanoparticle filtering membrane configured to filter nanoparticles from the fluid sample, wherein the one or more filtration chambers comprise a nanoparticle filtering chamber comprising the nanoparticle filtering membrane, wherein the nanoparticle filtering membrane comprises pores;

a waste liquid accommodation chamber disposed downstream of the nanoparticle filtering chamber, and configured to store the filtered fluid sample;

a particle collector chamber connected to the nanoparticle filtering chamber for collecting the nanoparticles that are in a specific size range filtered by the nanoparticle filtering membrane;

a plurality of microchannels comprising a first microchannel, a second microchannel and a third microchannel, wherein the nanoparticle filtering chamber is connected to and in fluid communication with the sample accommodation chamber via the first microchannel, wherein the waste liquid accommodation chamber is connected to and in fluid communication with the nanoparticle filtering chamber via the second microchannel, wherein the second microchannel is connected to a lower portion of the nanoparticle filtering chamber, wherein the particle collector chamber is connected to and in fluid communication with the nanoparticle filtering chamber via the third microchannel, wherein the third microchannel is connected to an upper portion of the nanoparticle filtering chamber;

a plurality of valves comprising a first valve configured to open and close the first microchannel, a second valve configured to open and close the second microchannel, and a third valve configured to open and close the third microchannel; and a controller configured to control rotation of the rotatable disc-shaped housing and further configured to control opening and closing of the first valve on the first microchannel, the second valve on the second microchannel and the third valve on the third microchannel, wherein the controller is configured to:

rotate the rotatable disc-shaped housing in a first rotational speed for transferring a portion of the fluid sample to the nanoparticle filtering chamber and filtering the nanoparticles with the nanoparticle filtering membrane, subsequently, close the first valve on the first microchannel and open the second valve on the second microchannel, while the first valve on the first microchannel is closed and the second valve on the second microchannel is open, rotate the rotatable disc-shaped housing in a second rotational speed for discharging waste liquid disposed downstream of the nanoparticle filtering membrane to the waste liquid accommodation chamber and recovering the filtered nanoparticles, wherein the second rotational speed is lower than the first rotational speed and causes the waste liquid to be discharged at a pressure lower than a capillary pressure in the pores of the nanoparticle filtering membrane, subsequently, open the third valve on the third microchannel, and while the third valve is open, further rotate the rotatable disc-shaped housing in a third rotational speed to collect, in the particle collector chamber, the nanoparticles that are (i) in the specific size range filtered by the nanoparticle filtering membrane and (ii) disposed upstream of the nanoparticle filtering membrane in the nanoparticle filtering chamber.

8. The nanoparticle separation apparatus of claim 7, wherein the filtration membranes are made of a material selected from the group consisting of polycarbonate, polystyrene, polymethylmethacrylate, a cyclic olefin copolymer, anodic aluminum oxide, nickel, and silicon.

9. The nanoparticle separation apparatus of claim 7, wherein the filtration membranes of the one or more filtration chambers comprise the nanoparticle filtering membrane and a prefiltering membrane stacked over the nanoparticle filtering membrane in the same chamber to collect nanoparticles through the filtration membranes having two or more sizes when the fluid sample is transferred in a single chamber.

10. The nanoparticle separation apparatus of claim 7, wherein the one or more filtration chambers comprises a prefiltering chamber comprising a prefiltering membrane, wherein the prefiltering chamber and the nanoparticle filtering chamber are arranged at different radial coordinates, the prefiltering chamber is located upstream of the nanoparticle filtering chamber, wherein the prefiltering membrane comprises pores greater than the pores of the nanoparticle filtering membrane.

11. A nanoparticle separation apparatus comprising:
a rotatable disc-shaped housing;
a sample accommodation chamber configured to provide a space in which a fluid sample is to be contained;
a filtration chamber disposed downstream of the sample accommodation chamber, and comprising one or more filtration membranes that comprise a nanoparticle filtering membrane that is configured to filter nanoparticles from the fluid sample, wherein the nanoparticle filtering membrane comprises pores;
a waste liquid accommodation chamber disposed downstream of the filtration chamber, and configured to store the filtered fluid sample;
a particle collector chamber connected to the filtration chamber for collecting the nanoparticles that are in a specific size range filtered by the nanoparticle filtering membrane;
a plurality of microchannels comprising a first microchannel, a second microchannel and a third microchannel, wherein the filtration chamber is connected to and in fluid communication with the sample accommodation chamber via the first microchannel, wherein the waste liquid accommodation chamber is connected to and in fluid communication with the filtration chamber via the second microchannel, wherein the second microchannel is connected to a lower portion of the filtration chamber, wherein the particle collector chamber is connected to and in fluid communication with the filtration chamber via the third microchannel, wherein the third microchannel is connected to an upper portion of the filtration chamber;
a plurality of valves comprising a first valve configured to open and close the first microchannel, a second valve configured to open and close the second microchannel, and a third valve configured to open and close the third microchannel; and
a controller configured to control rotation of the rotatable disc-shaped housing and further configured to control opening and closing of the first valve, the second valve and the third valve, wherein the controller is configured to:

rotate the rotatable disc-shaped housing in a first rotational speed for transferring a portion of the fluid sample to the filtration chamber and filtering the nanoparticles with the nanoparticle filtering membrane, subsequently, close the first valve on the first microchannel and open the second valve on the second microchannel, while the first valve is closed and the second valve is open, rotate the rotatable disc-shaped housing in a second rotational speed for discharging waste liquid disposed downstream of the nanoparticle filtering membrane to the waste liquid accommodation chamber and recovering the filtered nanoparticles, wherein the second rotational speed is lower than the first rotational speed and causes the waste liquid to be discharged at a pressure lower than a capillary pressure in the pores of the nanoparticle filtering membrane, subsequently, open the third valve on the third microchannel, and while the third valve is open, further rotate the rotatable disc-shaped housing in a third rotational speed to collect, in the particle collector chamber, the nanoparticles that are (i) in the specific size range filtered by the nanoparticle filtering membrane and (ii) disposed upstream of the nanoparticle filtering membrane in the filtration chamber.

12. The nanoparticle separation apparatus of claim 11, wherein the sample accommodation chamber is configured to perform sample purification to enable purification of impurities in the fluid sample.

13. The nanoparticle separation apparatus of claim 11, wherein the sample accommodation chamber comprises, in a lower portion thereof, a space formed at an angle more inclined than a radial direction to perform impurity separation.

14. The nanoparticle separation apparatus of claim 11, wherein the sample accommodation chamber comprises a groove configured to inhibit separated impurities from flowing backward.

15. The nanoparticle separation apparatus of claim 11, wherein the sample accommodation chamber comprises an inclined surface and a curved line to minimize loss of and damage to the fluid sample when the fluid sample is transferred.

16. The nanoparticle separation apparatus of claim 11, wherein the waste liquid accommodation chamber configured to separate high-purity nanoparticles without separate impurity processing.

17. The nanoparticle separation apparatus of claim 11, further comprising one or more fasteners configured to fasten the filtration chamber.

18. The nanoparticle separation apparatus of claim 11, wherein the filtration chamber and the waste liquid accommodation chamber comprise a vent configured to perform smooth filtration.

19. A nanoparticle separation apparatus comprising:
a rotatable disc-shaped housing;
a sample accommodation chamber configured to provide a space in which a fluid sample is to be contained;
a filtration chamber disposed downstream of the sample accommodation chamber, and comprising one or more filtration membranes that comprise a nanoparticle filtering membrane configured to filter nanoparticles from the fluid sample, wherein the nanoparticle filtering membrane comprises pores;

a waste liquid accommodation chamber disposed downstream of the filtration chamber, and configured to store the filtered fluid sample;

a plurality of microchannels comprising a first microchannel and a second microchannel, wherein the filtration chamber is connected to and in fluid communication with the sample accommodation chamber via the first microchannel, wherein the waste liquid accommodation chamber is connected to and in fluid communication with the filtration chamber via the second microchannel, wherein the second microchannel is connected to a lower portion of the filtration chamber;

a plurality of valves comprising a first valve configured to open and close the first microchannel and a second valve configured to open and close the second microchannel;

a particle collector configured to recover the nanoparticles within a specific size range filtered from the fluid sample;

the plurality of microchannels further comprising a third microchannel, wherein the particle collector is connected to and in fluid communication with the filtration chamber via the third microchannel, wherein the third microchannel is connected to an upper portion of the filtration chamber;

the plurality of valves further comprising a third valve configured to open and close the third microchannel; and a controller configured to control rotation of the rotatable disc-shaped housing and further configured to control opening and closing of the first valve, the second valve and the third valve, wherein the controller is configured to:

rotate the rotatable disc-shaped housing in a first rotational speed for transferring a portion of the fluid sample to the filtration chamber and filtering the nanoparticles with the nanoparticle filtering membrane, subsequently, close the first valve on the first microchannel and open the second valve on the second microchannel, while the first valve is closed and the second valve is open, rotate the rotatable disc-shaped housing in a second rotational speed for discharging waste liquid disposed downstream of the nanoparticle filtering membrane to the waste liquid accommodation chamber and recovering the filtered nanoparticles, wherein the second rotational speed is lower than the first rotational speed and causes the waste liquid to be discharged at a pressure lower than a capillary pressure in the pores of the nanoparticle filtering membrane, subsequently, open the third valve on the third microchannel, and while the third valve is open, further rotate the rotatable disc-shaped housing in a third rotational speed to collect, in the particle collector chamber, the nanoparticles that are (i) in the specific size range filtered by the nanoparticle filtering membrane and (ii) disposed upstream of the nanoparticle filtering membrane in the filtration chamber.

* * * * *